United States Patent
Khan et al.

(10) Patent No.: US 12,149,417 B2
(45) Date of Patent: Nov. 19, 2024

(54) EFFICIENT MAINTENANCE FOR COMMUNICATION DEVICES

(71) Applicant: Hughes Network Systems, LLC, Germantown, MD (US)

(72) Inventors: Tayyab Khan, Germantown, MD (US); Venkat Ganesan, Germantown, MD (US); Sajid Arastu, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 193 days.

(21) Appl. No.: 17/375,061

(22) Filed: Jul. 14, 2021

(65) Prior Publication Data
US 2023/0014795 A1  Jan. 19, 2023

(51) Int. Cl.
| | | |
|---|---|---|
| *H04L 12/24* | (2006.01) | |
| *G06N 3/08* | (2023.01) | |
| *G06N 7/01* | (2023.01) | |
| *H04L 41/14* | (2022.01) | |
| *H04L 41/147* | (2022.01) | |

(52) U.S. Cl.
CPC ............ *H04L 41/147* (2013.01); *G06N 3/08* (2013.01); *G06N 7/01* (2023.01); *H04L 41/145* (2013.01)

(58) Field of Classification Search
CPC ..... H04L 41/147; H04L 41/145; H04L 41/16; H04L 41/149; G06N 3/08; G06N 7/01
See application file for complete search history.

(56) References Cited

U.S. PATENT DOCUMENTS

| | | |
|---|---|---|
| 8,233,500 B2 | 7/2012 | Beser |
| 10,375,643 B2 | 8/2019 | Brisebois et al. |
| 10,616,138 B2 | 4/2020 | El Gamal et al. |
| 10,911,134 B1 | 2/2021 | Choquette et al. |
| 10,990,894 B2 | 4/2021 | Shaashua et al. |
| 2016/0378405 A1* | 12/2016 | Resch ................. G06F 11/1092 711/114 |

(Continued)

OTHER PUBLICATIONS

He Qing et al., "A Meta-Learning Scheme for Adaptive Short-Term Network Traffic Prediction", Oct. 2020. IEEE Journal. Retrieved on Jun. 15, 2023. Retrieved from <https://ieeexplore.ieee.org/stamp/stamp.jsp?arnumber=9109582> (Year: 2020).*

(Continued)

*Primary Examiner* — Gil H. Lee
*Assistant Examiner* — Juan C Turriate Gastulo
(74) *Attorney, Agent, or Firm* — Fish & Richardson P.C.

(57) ABSTRACT

Methods, systems, and apparatus, including computer programs encoded on computer storage media, for determining a terminal idle time. In some implementations, a server can obtain communication data from a plurality of devices in a communication network, wherein the communication data indicates levels of network traffic for the device over time. The server can generate an idle period forecasting model configured to predict occurrence of future communication idle periods in which communication activity is predicted to be below a threshold. The server can provide the idle period forecasting model to each of the plurality of devices such that the devices can respectively use the idle period forecasting model to locally predict future communication idle periods of the devices.

20 Claims, 9 Drawing Sheets

(56) References Cited

U.S. PATENT DOCUMENTS

| | | | | |
|---|---|---|---|---|
| 2019/0334785 | A1* | 10/2019 | Penar | H04L 41/142 |
| 2020/0092176 | A1* | 3/2020 | Huberman | G06F 17/18 |
| 2020/0136975 | A1 | 4/2020 | Arora et al. | |
| 2020/0209946 | A1* | 7/2020 | Visconti | G06F 9/45558 |
| 2020/0285503 | A1* | 9/2020 | Dou | G06F 9/5072 |
| 2021/0064388 | A1* | 3/2021 | Gardner | G06N 20/00 |
| 2022/0052933 | A1* | 2/2022 | Bhatnagar | H04L 47/83 |
| 2022/0222082 | A1* | 7/2022 | Gopalakrishnan | G06F 9/44578 |
| 2022/0261661 | A1* | 8/2022 | Khaligh | G06Q 10/0631 |
| 2022/0391722 | A1* | 12/2022 | Sethi | G06N 5/04 |

OTHER PUBLICATIONS

TensorFlow.org [online], "TensorFlow Lite | ML for Mobile and Edge Devices," Sep. 2018, retrieved on Nov. 8, 2021, retrieved from URL <https://www.tensorflow.org/lite>, 6 pages.

TowardsDataScience.com [online], "Forecasting using Granger's Causality and Vector Auto-regressive Model," Oct. 2019, retrieved on Nov. 8, 2021, retrieved from URL <https://towardsdatascience.com/granger-causality-and-vector-auto-regressive-model-for-time-series-forecasting-3226a64889a6>, 19 pages.

He et al., "A meta-learning scheme for adaptive short-term network traffic prediction," IEEE Journal on Selected Areas in Communications, Oct. 2020, 38(10):2271-2283.

Invitation to Pay Additional Fees in International Appln. No. PCT/US2022/036797, dated Oct. 7, 2022, 14 pages.

International Search Report and Written Opinion in International Appln. No. PCT/US2022/036797, mailed on Dec. 2, 2022, 20 pages.

International Preliminary Report on Patentability in International Appln. No. PCT/US2022/036797, mailed on Jan. 25, 2024, 12 pages.

* cited by examiner

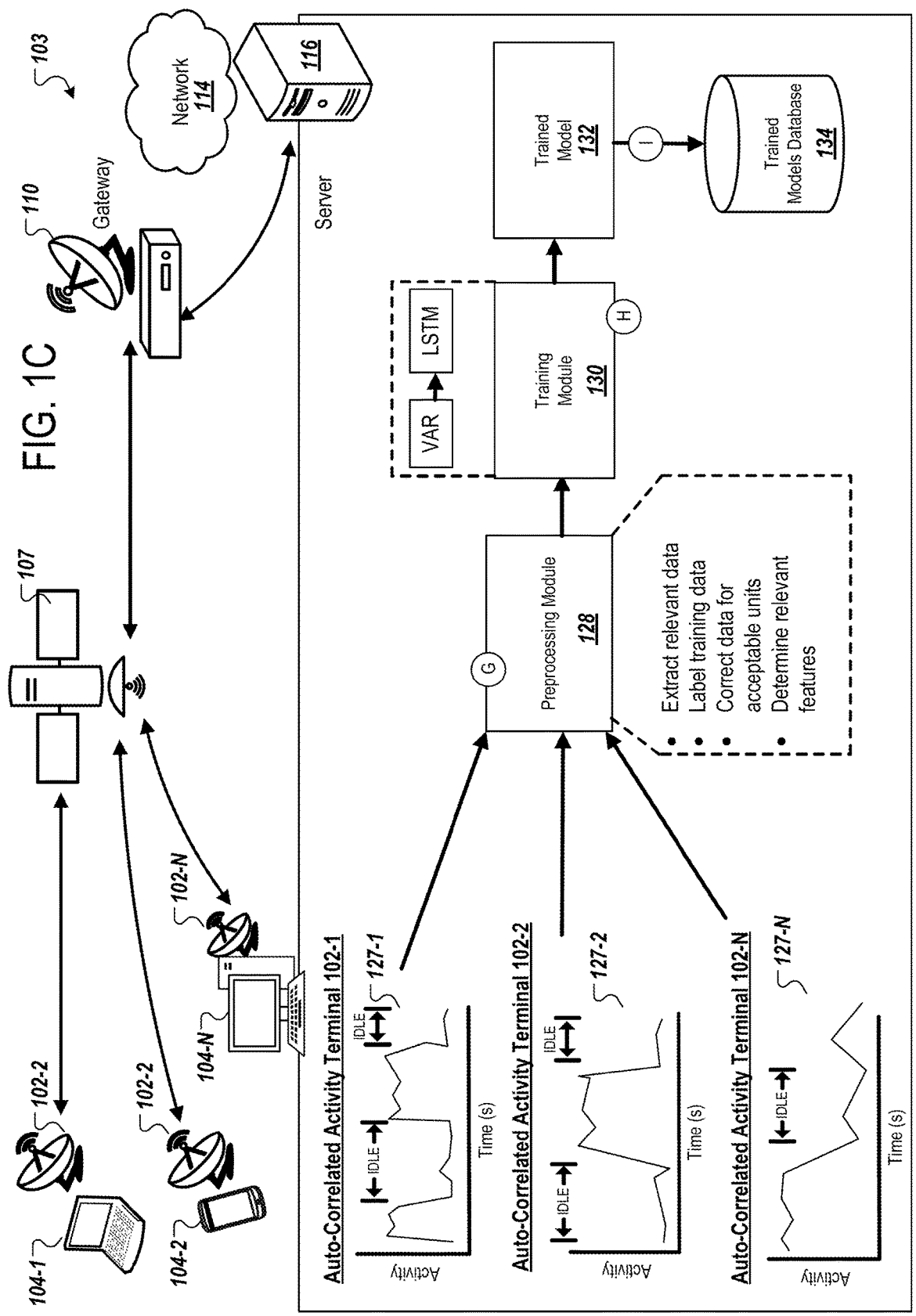

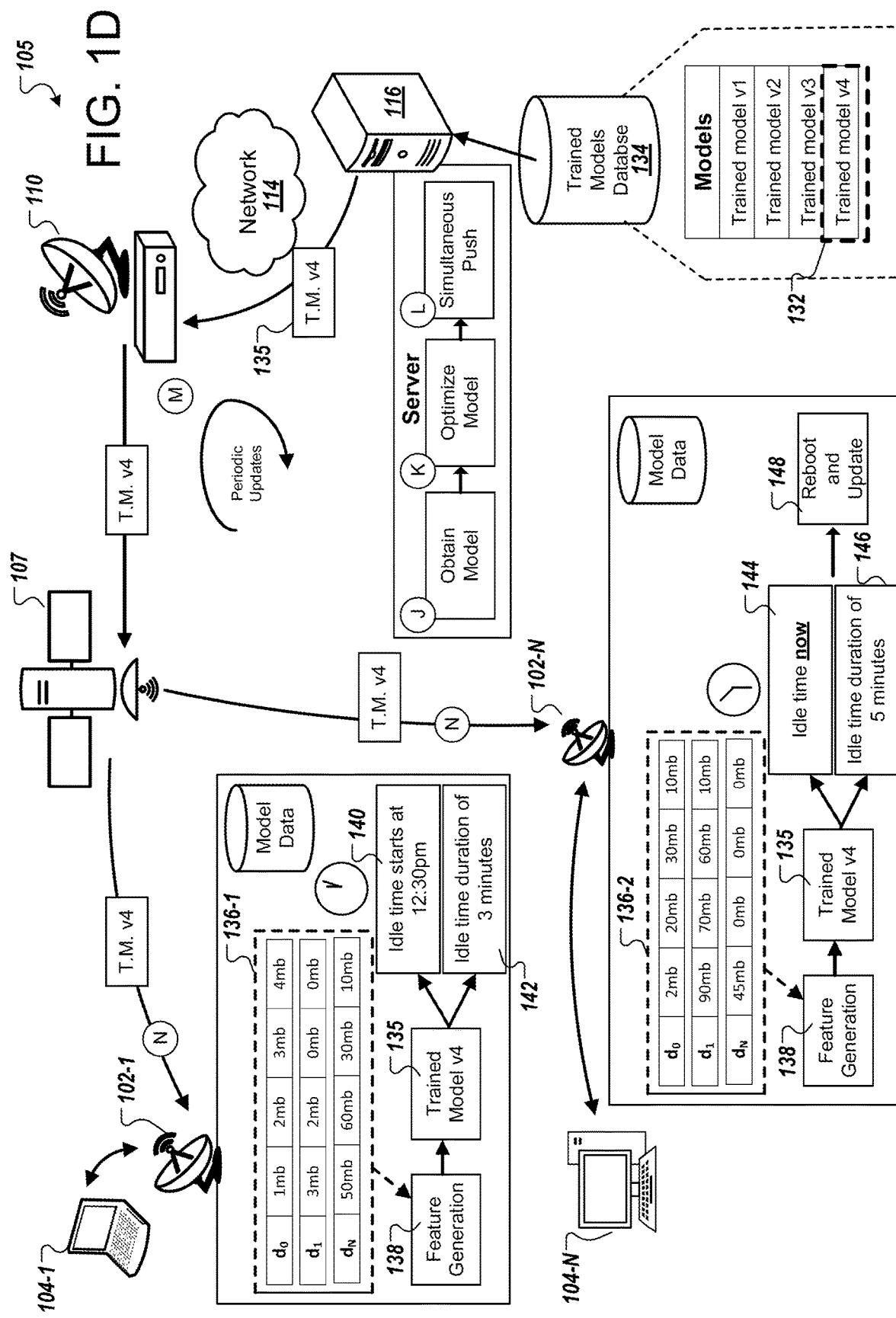

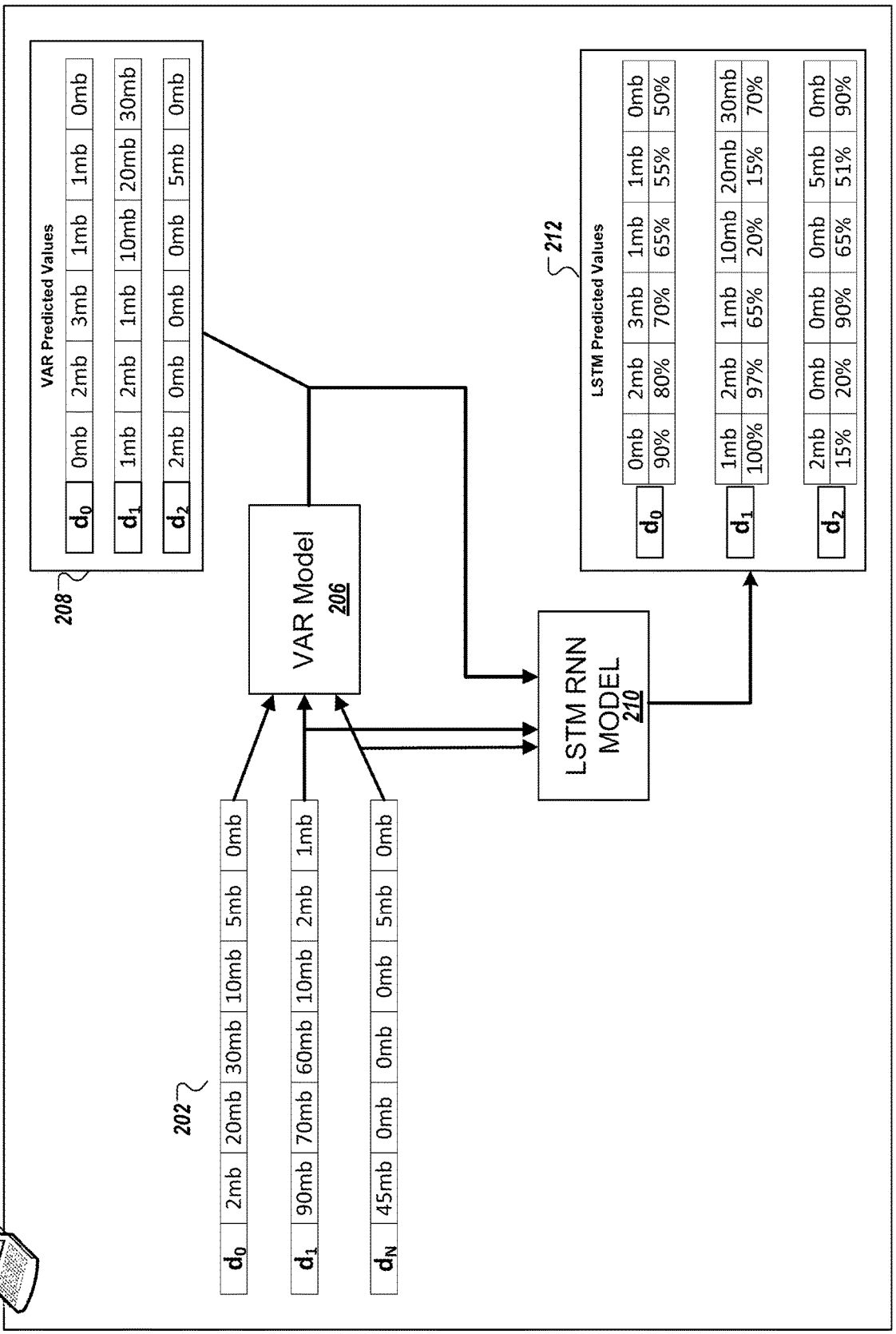

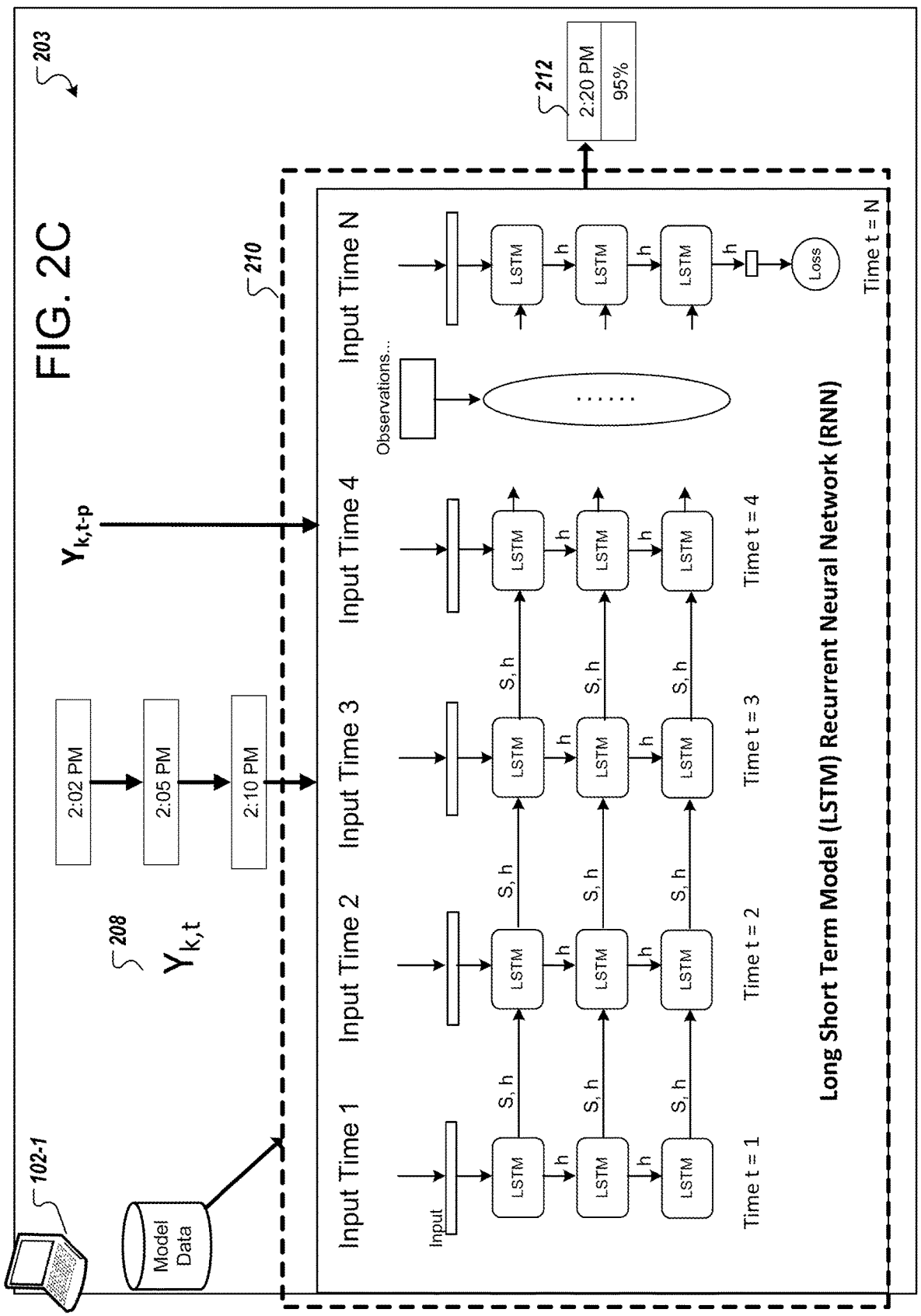

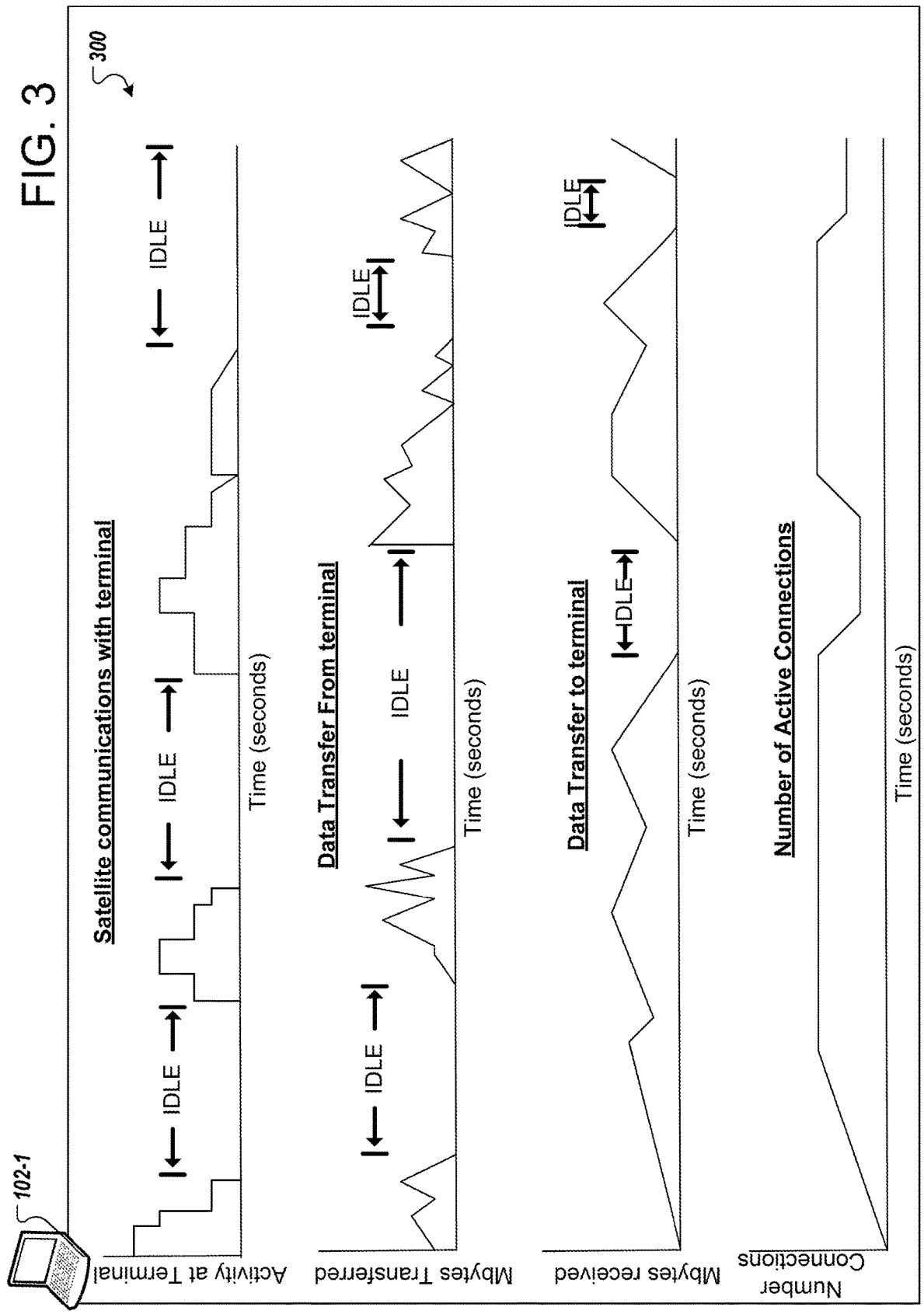

Obtaining, by the one or more computers, communication data from a plurality of devices in a communication network, wherein the communication data from each device indicates levels of network traffic for the device over the communication network over time
402

Generating, by the one or more computers, an idle period forecasting model configured to predict occurrence of future communication idle periods in which communication activity is predicted to be below a threshold
404

Providing, by the one or more computers, the idle forecasting model to each of the plurality of devices such that the devices can respectively use the idle period forecasting model to locally predict future communication idle periods of the devices
406

FIG. 4

EFFICIENT MAINTENANCE FOR COMMUNICATION DEVICES

BACKGROUND

Some computer systems provide computing resources to other devices. To ensure the other devices have continuous access to these resources, these computer systems need to be operating at peak performance and sometimes require maintenance. However, when the computer systems perform such maintenance, this can interrupt service to the other devices at times that are inconvenient to the other devices.

SUMMARY

In some implementations, a communication system can generate and apply a machine-learning model that determines a terminal idle time using network activity aggregated from multiple terminals. The communication system can correspond to a satellite communication system that includes multiple terminals, a gateway system, another server system, and a satellite system that relays communications between the multiple terminals and the gateway system. Each of the multiple terminals can connect to one or more client devices that can request or provide data, which is subsequently transmitted over the satellite to the gateway system. The gateway can connect to a separate sever that generates the machine-learning model for determining the terminal idle time. Moreover, the gateway can provide the network activity from the multiple terminals to the separate server system.

In some implementations, the communication system can schedule maintenance activities at each of the terminals. The maintenance activities can include, for example, software upgrades, hardware upgrades, operating system upgrades, and the like. The terminals can be required to reboot or restart so the maintenance event can take place. As mentioned, the client devices may request or provide data through their corresponding connected terminal. Thus, it is not desirable for a terminal to be turned off when the client devices seek to request or provide data through the rebooting terminal. To ensure terminal availability, these maintenance activities need to be performed at the terminal at times most convenient to the client devices or end users associated with the client devices. Said another way, the terminal cannot be rebooted or restarted at a time in which one or more of the client devices may request or provide network activity through that terminal during the maintenance period, or network activity will cease at the offline terminal. Thus, the communication system seeks to learn and identify the traffic habits of the client devices with the terminal in order to schedule maintenance at the terminals with minimal disruptions to the client device traffic.

In some implementations, the server system can train and generate the machine-learning model. The machine-learning model can be an idle period forecasting model that is trained to predict occurrence of future communication idle periods. The server system can obtain communication data that includes the network and traffic activity from each of the terminals. The network and traffic activity from each of the terminals can include, for example, local (e.g., communication between client devices and terminal) bytes received, local bytes sent, satellite network (e.g., communication between terminal and satellite) bytes received, satellite network bytes transmitted, and terminal available memory, among other things. The network and traffic activity can be obtained in a data structure format, indicating the byte or bit movement at various time indices. The communication data can indicate various levels of the network and traffic activity over periods of time.

Additionally, the server system can obtain logs or reports generated by the terminals that indicate device data associated with the terminal. The device data can include for example, a number of client devices connected to the terminal, a number of active client devices, a number of inactive client devices, scheduled and unscheduled application activity, a number of requests made by each of the client devices, historical activity associated with each client device and the terminal, and data types requested and provided from each terminal. The server system can use the network and traffic activity as well as the device data from the monitored logs to train the idle period forecasting model.

After receiving the aggregate network and traffic activity and the device data from each of the terminals, the server system can generate corresponding scores and metrics for the received communication data. For example, for the communication data received from each device, the server system can generate a series of scores or a series of vectors that include values that describe the network traffic occurring over a corresponding time period. The series of scores can include one or more values over a set period of time for the particular terminal. The one or more values can correspond to the communication data obtained for that particular terminal. The server system can generate a number of scores or vectors, such as 10 or 100 vectors, for the communication data for each terminal. Each generated score can include values over a set period of time and the scores can correspond to a continuous period of time. In some cases, the server system can generate a score for the entirety of the continuous period of time.

The scores of data for each terminal can illustrate various progressions of communication data. For example, these progressions can indicate network activities that lead to patterns of idle times, network activities that follow patterns of idle times, network activities that indicate patterns of idle times, and network that indicate patterns of non-idle times. The server system can train the machine-learning model to identify these progressions and ultimately predict future idle periods at a particular terminal.

After generating the scores of data for each terminal, the server system can analyze the score for each terminal using statistical analyses. In some implementations, the server system can generate and apply labels to each of the scores. The labels can include, for example, indications of idle periods within a data structure, and indications of non-idle periods within the data structure. An idle period can be defined in a variety of ways, such as for example, a time period of disconnect between a client device and a terminal, a time period in which an active connection between a client device and terminal exist but no communication exist, a time period in which a terminal is off, and/or a time period in which the client devices are turned off. The server system can generate the label that includes an indication of idle or non-idle periods, the score the label corresponds to, and the number of cells in the score that the idle or non-idle period covers. The server system can also apply other statistical analyses to the scores that include can include heuristics, ranking, and evaluating the scores with metrics that indicate the inclusion or non-inclusion of idle periods, to name a few examples.

In response to labeling the received scores, the server system can analyze the received scores. For example, the server system can compare the received scores from each of the terminals to determine and identify patterns between the scores. The server system may employ correlations, autocorrelations, and other heuristically determined activities to identify idle periods in the received scores associated with each of the terminals. The server system can generate time series forecasting data resulting from these heuristically determined activities that show comparisons of idle periods between different and similar data structures. By identifying the idle periods in the received scores, the server system can train the machine-learning model to predict future idle periods during application of the model.

The server system can employ a machine-learning model that includes a Long Short Term Memory (LSTM) Recurrent Neural Network (RNN). The LSTM RNN can be employed to predict an idle period at each of the terminals once deployed. To improve the training and ultimately, the accuracy of the LSTM RNN's prediction, the server system can employ a Vector Auto Regression (VAR) model that fits the values to be provided to the LSTM RNN. For example, the VAR model can receive the generated time series forecasting data of training data as input and output fitted values based on its analysis of the internal behavior of the time forecast series data. The server system can then feed the LSTM model the output fitted values produced by the VAR model for training.

In some implementations, the server system can deploy the training machine-learning model to each of the terminals once sufficiently trained. For example, the server system may determine with time series forecasting data that the trained machine-learning model is able to predict current or future idle periods with sufficient accuracy. Afterwards, the server system can, in a single push, transmit the trained machine-learning model to the gateway, which subsequently transmits the trained model over the satellite and down to each of the terminals. Thus, each terminal can receive the same machine-learning model that has been trained by the aggregate network data from each of the terminals.

Each terminal can receive the newly trained model and replace the previous model with the newly received trained model. In some implementations, the terminal can then monitor network traffic and usage from its connected client devices on a continuous basis. On continuous intervals, the terminal can then generate feature data or feature vectors (scores) from the monitored network traffic and provide the generated feature data to the newly trained model. The model can then output a predicted idle time for performing maintenance at the terminal.

In some implementations, the predicted idle time output by the model can indicate a time period of idle time for the terminal. The model can also output a classification that the current time corresponds to a period of idle time. In some implementations, the model can also output an indication in the future that includes a specific start time of an idle period and a specific end time of the idle period for that terminal. The type of output from the trained model is dictated based on how the server system trains the machine-learning model. Thus, the trained model can output a variety of predications that assist the terminal in performing maintenance activities.

Once the terminal obtains a predicted idle time and potentially, a duration of the idle time, from the trained model, the terminal can perform the maintenance action at the predicted idle time. By performing the maintenance action at the predicted idle time, the terminal can ensure that operations between the client devices and the terminal can continue to run with minimal disruptions to the client devices while the maintenance activity is performed.

In some implementations, the terminal can employ one or more verifications before performing the maintenance at the predicted idle time. If the terminal determines that the predicted idle time has arrived and also determines that a connection between a client device and the terminal exists with throughput greater than a predetermined amount, e.g., less than 1 megabyte per second, such as 0.5 megabytes per second (MB/s), for example, then the terminal can decide not to disrupt the connection and defer the maintenance action at the next predicted idle time, for example.

In some implementations, the prediction of idle times at a terminal can be applied to bandwidth usage. For example, each terminal can monitor the average bandwidth amount used based on an amount of client device bandwidth used. The terminal can use a similar trained machine-learning model to predict the likelihood that the terminal moves into a "Throttled" state. In a "Throttled" state, the service between the client device and the terminal is throttled to a lower speed when a customer or client device exceeds the regular data allowance limit. In this case, the trained machine-learning model at the terminal can analyze fixed time series forecast data and generate the likelihood that the client device will move into a "Throttled" state. The terminal can provide an indication as a warning to the client device that the client device is close to exceeding their regular data allowance limit.

In some implementations, terminals need to be operating at peak performance and with the highest efficiency to meet the demand of the end client devices with minimal service disruptions due to period updates and faults. This becomes essential in geographic remote operations such as in a satellite communication system. By predicting the likelihood of client devices getting into a specific network state, such as a quiet period, preventive maintenance at the terminal can automatically be scheduled. Such preventive maintenance markers can include deterioration in terminal perform in terms of available memory usage, average active usage of device until device failure, poor link quality, and other service disruptions.

By running automated predictive maintenance at the terminal to optimize timely resolutions of issues, the uninterrupted service for client devices can be extended by reducing expensive maintenance and labor costs in correct the issues at the terminals. By running the trained model at the terminal to predict the best scheduled time to perform the preventive maintenance, the communication system can be provided with many benefits such as reducing client call volume due to service interruptions, truck roll operations cost to repair terminals that may be located in remote locations across the globe, and overall expansion of lifecycle of the terminals. In addition, by controlling the cost of maintenance and lower customer call volumes, these techniques described below prevent additional data collection of client device by increasing privacy and reducing traffic overhead for a decentralized system, e.g., such as a central server system which evaluates time series forecasting data and then sends the appropriate action to the terminals. Since such trained models that run on the terminals can be upgraded easily, a centralized server can deploy new and improved machine-learning models after training in a continuous fashion.

In one general aspect, a method performed by one or more computing devices includes: obtaining, by the one or more computers, communication data from a plurality of devices in a communication network, wherein the communication data from each device indicates levels of network traffic for the device over the communication network over time; generating, by the one or more computers, an idle period forecasting model configured to predict occurrence of future communication idle periods in which communication activity is predicted to be below a threshold; and providing, by the one or more computers, the idle period forecasting model to each of the plurality of devices such that the devices can respectively use the idle period forecasting model to locally predict future communication idle periods of the devices.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes for each of the devices, generating, by the one or more computers, series of scores for the device based on the communication data for the device, wherein the scores in the series correspond to different time periods in a series of time periods and include values that describe network traffic occurring over the corresponding time period.

In some implementations, the method includes for each of the devices, generating the series of scores for the devices based on the communication data for the device includes generating, by the one or more computers, labeled data for each score in the series of scores, the generated labeled data indicating one or more idle periods in each score.

In some implementations, the method includes generating the labeled data for each score in the series of scores, the generated labeled data indicating the one or more idle periods in each score further comprises generating, by the one or more computers, labels to indicate the one or more idle periods within each score, wherein the labels include data that describes a starting index and an ending index within each score that represents the one or more idle periods.

In some implementations, the method includes wherein generating the idle period forecasting model configured to predict the occurrence of future communication idle periods in which communication activity is predicted to be below a threshold further comprises wherein the idle period forecasting model being configured to predict idle periods based on input data describing network traffic for the device over a series of prior time periods and the idle period forecasting model is generated based on correlating characteristics of network traffic indicated by the respective series of scores with later-occurring periods identified as idle periods.

In some implementations, the method includes generating the idle period forecasting model configured to predict the occurrence of future communication idle periods in which the communication activity is predicted to be below the threshold further includes: generating, by the one or more computers, time series forecasting data, the time series forecasting data a result from comparing the labeled data from each device of the plurality of devices, wherein generating the time series forecasting data further includes: correlating, by the one or more computers, each of the scores in the series of scores from each device; auto-correlating, by the one or more computers, each score in the series of scores with a past lagged version of the same score to identify dependencies between one or more variables in the communication data; determining, by the one or more computers, (i) first patterns across the one or more correlated and auto-correlated scores that illustrate traffic data leading up to an idle period at each device and (ii) second patterns across the one or more correlated and auto-correlated scores that illustrate traffic data of idle periods at each device; and determining, by the one or more computers, training data by comparing the first patterns and the second patterns to samples from a probability distribution function using hypothesis testing.

In some implementations, the method includes the idle period forecasting model includes a vector autoregressive statistical (VAR) model and a Long Short-Term Memory Recurrent Neural Network (LSTM RNN).

In some implementations, the method includes in response to providing the idle period forecasting model to each of the plurality of devices, the method further includes: receiving, by a device at each of the plurality of devices, the idle period forecasting model from the one or more computers; obtaining, by the device, the communication data representing network and traffic usage between (i) one or more client devices and the device and (ii) the device and the one or more computers that communicate through a satellite; generating, by the device, scores from the data representing the network and traffic usage on a periodic interval; providing, by the device, the scores to the received idle period forecasting model; obtaining, by the device, an idle time prediction from an output of the received idle period forecasting model, the idle time prediction indicating a future time at which the device can undergo maintenance; determining, by the device, a current time corresponds to the obtained idle time; and in response, performing, by the device, the maintenance to avoid disruption to the one or more client devices connected to the device.

In some implementations, receiving the idle period forecasting model from the one or more computers further includes: determining, by the device, an idle time using a previous machine-learning model; determining, by the device, a current time corresponds to the determined idle time; and in response to determining the current time corresponds to the determined idle time, replacing, by the device, the previous machine-learning model with the received idle period forecasting model.

In some implementations, obtaining the communication data representing the network and traffic usage further includes: obtaining, by the device, the communication data representing the network and traffic usage comprising at least one of (i) terminal monitoring load seconds, (ii) local network data received, (iii) local network data sent, (iv) satellite network data received, (v) satellite network data transmitted, (vi) transmitted output data unavailability percentage, (vii) packet send errors, (viii) terminal no-connect duration, (ix) terminal healthy status time, or (x) terminal available system memory.

In some implementations, the method includes obtaining, by the device, a classification from the output of the received idle period forecasting model that indicates a current time corresponds to the idle time and a duration of the idle time; and in response, performing, by the device, the maintenance during the duration of the idle time to avoid disruption to the one or more client devices connected to the device.

In some implementations, the method includes in response to determining the current time corresponds to the obtained idle time, the method further includes: determining, by the device, network activity between the device and the one or more connected client devices is above a threshold;

ceasing, by the device, the maintenance at the determined current time based on the determined network activity being above the threshold; and providing, by the device, the network activity and an indication to cease the maintenance to the one or more computers over the satellite for retraining the idle period forecasting model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A-1D are block diagrams that illustrate examples of systems for performing efficient maintenance in satellite terminals.

FIGS. 2A-2C are block diagrams that illustrate examples of a terminal determining an idle time using a machine-learning model.

FIG. 3 is a block diagram that illustrates an example of traffic and network activity at a particular terminal.

FIG. 4 is a flow diagram that illustrates an example of a process for performing efficient maintenance in satellite terminals.

Like reference numbers and designations in the various drawings indicate like elements.

DETAILED DESCRIPTION

Figure 1A:
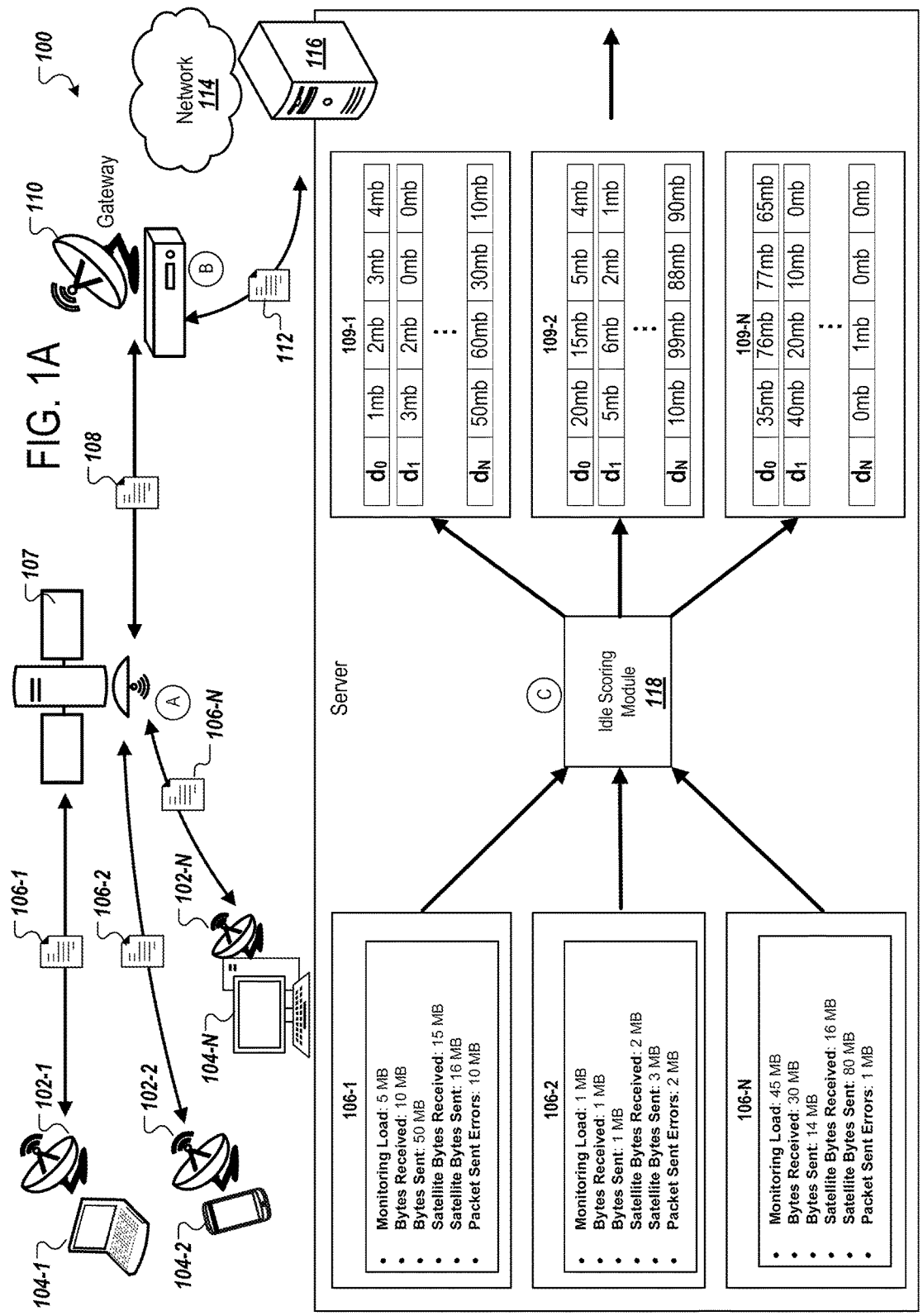

FIG. 1A is a block diagram that illustrates an example of a system 100 for performing efficient maintenance in satellite terminals. The example of FIG. 1A shows a satellite communication system, but the techniques described here can be used in other communication systems. The system 100 includes a gateway 110 that communicates with a satellite 107, and the satellite 107 communicates with various satellite terminals 102-1 through 102-N (collectively terminals "102"). The terminals 102 can also be referred to as devices 102. Each terminal or device 102, can be a hub, a router, a modem, or some other communication device that provides a network access, e.g., connection to a LAN or WAN network, to one or more other connected client devices.

The satellite 107 and the gateway 110 (along with other network components) can cooperate to transfer data to and from the terminals 102 to a separate connected network 114, which can include and communicate with the Internet. Each of the terminals 102-1 through 102-N can be in communication with one or more client devices, such as hand-held devices, telephones, laptop computers, desktop computers, Internet of Things (IoT) devices, and so on, which make use of the network connections the terminals 102-1 through 102-N, the satellite 107, and the gateway 110. Additionally, the gateway 110 can be in communication with a server system 116 over network 114. FIG. 1A illustrates various operations in stages (A) through (C) which can be performed in the sequence indicated or in another sequence.

In the example of FIG. 1A, the system 100 generates time series forecasting data from network and traffic activity aggregated from each of the terminals 102. The time series forecasting data is applied to train machine-learning techniques to predict idle times associated with a particular terminal. The idle time associated with the terminal can indicate periods of inactivity between the terminal, such as terminal or device 102-1, and its connected client device.

The system 100 can provide the trained machine-learning model to each of the terminals 102. In this manner, each terminal can individually determine its own idle time based on the client device's traffic and network activity behavior. In some implementations, each terminal can use its own trained machine-learning model to generate an idle time on a periodic basis. For example, as the terminal receives network and traffic data from the terminal, the terminal can generate the time series forecasting data and provide this generated time series forecasting data to the trained model every hour to produce a predicted idle time. Other periodic times are also possible.

Typically, when scheduled maintenance is performed at the terminal, the terminal is required to reboot. If the terminal reboots at a time when one of the connected client devices requests service, then service requests cannot be fulfilled. During these idle times, the terminal can schedule and perform maintenance to fix/repair and/or upgrade software or hardware components within the terminal. By performing the maintenance at the scheduled idle times, the terminal can minimize any impact to the service to the client devices (e.g., client devices 104-1 through 104-N). In some implementations, each terminal can be connected to one or more client devices.

In some implementations, the terminal may require maintenance actions to ensure uninterrupted service with the client devices. For example, if the terminal is exhibiting a memory leak or experiencing a connectivity issue, then the terminal may need to be restarted or updated with a new software fix at a time that is most convenient to the end user or client device. The terminal can fix the memory leak (or clearing of the cache) or install new software with the use of a reboot or restart. With the use of predicted idle times, the system 100 can avoid user service disruptions on the periodic basis and perform the scheduled maintenance with little to no impact to the end user.

During stage (A), the terminals 102 can exhibit network traffic data from its client devices. For example, client device 104-1 may request video data from the internet and provide the request to the terminal 102-1 over a local network. The local network can include Bluetooth, Wi-Fi, ZigBee, or some other short communication medium. The terminal 102-1 may transmit the request to the satellite 107, which ultimately transmits the request to the gateway 110 over network 114 and out to the Internet. The gateway 110 can return the requested video from the Internet and provide the video back to the terminal 102-1 through the satellite 107. The terminal 102-1 can then provide the video to the client device 104-1 to meet the corresponding user's request.

This process of requesting for media from a client device to a terminal can repeat for any of the client devices 104-1 through 104-N. Additionally, each terminal may be connected to multiple client devices. For example, terminal 102-1 may be connected to ten client devices, terminal 102-2 may be connected to five client devices, and terminal 102-N may be connected to nine client devices. These client devices can include, for example, a smart watch, a desktop, a smart television, a laptop, a mobile device, a handheld device, and the like. Each client device may communicate with its corresponding terminal to request or provide data.

Each terminal 102 can monitor the communication data associated with each of its connected client devices. For example, each terminal can track the communication data that includes network and data traffic regarding connectivity with each of its connected client devices. The communication data can include, for example, terminal monitoring load seconds, local network bytes received, local network bytes transmitted, satellite network bytes received, satellite network bytes transmitted, outbound unavailability percentage on a periodic basis, e.g., hourly daily, packet transmission errors, terminal no-connect duration, terminal healthy status time, and terminal available system memory. Each terminal can monitor the communication data over a period of time.

The terminal monitoring load seconds can correspond to the amount of time a terminal becomes idle and remains in idle for an idle timer duration. A terminal is idle if no user data is transferred through the satellite 107 and no TCP sessions are currently spoofed. The terminal transitions out of the idle state when user data is received in an associated state, transitions when there is a large difference between the cutoff-load the gateway's current load, or transitions when keep-alive messages are lost for a configured maximum number of times, to selecting the gateway 110's state. The local network bytes received can correspond to the amount of data in bits or bytes, e.g., 10 MB, the terminal has received from a connected client device. The local network bytes transmitted can correspond to the amount of data in bits or bytes that the terminal has transmitted to a connected client device. The satellite network bytes received can correspond to the amount of data in bits or bytes the terminal has received. The satellite network bytes transmitted can correspond to the amount of data in bits or bytes the terminal has transmitted to either the gateway 110 or the satellite 107. The outroute unavailability percentage can correspond to a percentage the outroute is unavailable for a defined measurement of time, e.g., every one hour, every two years, etc. The outroute corresponds to the transmission path from the Internet to the gateway 110, to the satellite 107, to the terminal. The packet transmission errors can correspond to the number of packets that the terminal transmitted and were not received by the gateway 110. The terminal no-connect duration can correspond to the amount of time a terminal is not connected to any of its client devices and the amount of time, e.g., number of seconds or hours, a terminal is not able to connect one of its client devices to the internet. The terminal healthy status time can correspond to an amount of time a particular terminal is operating in a normal and healthy fashion. Lastly, the terminal available system memory can correspond to an amount of available memory at the terminal over a particular period of time.

The terminal can also store additional monitored data traffic for each of its connected client devices. For example, the terminal can store client device data in logs or reports. The client device data can include a number of client devices connected to the terminal, a number of active client devices, a number of inactive client devices, scheduled and unscheduled application activity, a number of requests made by each of the client devices, historical activity associated with each client device and the terminal, and data types requested and provided from each terminal.

The server system 116 can request the communication data from each terminal 102 in system 100. In some implementations, the server system 116 may request the communication data from each terminal 102 over a previous time period. The time period can be, for example, a designated time period, a past month, the previous day, or a specified previous time period, such as the past year. Each terminal 102 can store and log its communication data in memory. For example, terminal 102-1 can provide its communication data 106-1 to the gateway 110 through the satellite 107. The terminal 102-2 can provide its communication data 106-2 to the gateway 110 through the satellite 107. The terminal 102-N can provide its communication data 106-N to the gateway 110 through the satellite 107.

During stage (B), the satellite 107 provides each communication data 108 received from the terminal to the gateway 110. The satellite 107 can provide the communication data 108 to the gateway 110 as it receives the communication data from the terminal, to act as a relay. The gateway 110 can receive the communication data 108 from the satellite 107 and provide the data structure 112 that includes the communication data from each terminal. The gateway 110 can add timestamps, identifiers for each terminal 102, and corresponding locations of each terminal 102 to the communication data 108 to generate the data structure 112. In some implementations, the processes performed by the server system 116 from stages (C) through (L) may be performed by the gateway 110. Then, the gateway 110 can transmit the data structure 112 to the server system 116 over the network 114.

During stage (C), the server system 116 can receive the data structure 112 and can extract the communication data corresponding to each terminal 102 from the data structure 112. As illustrated in FIG. 1A, the server system 116 extracts the communication data 106-1 corresponding to terminal 102-1, communication data 106-2 corresponding to terminal 102-2, and communication data 106-N corresponding to terminal 102-N, from the data structure 112.

Each communication data package includes a time series of network and traffic usage data in the form of bytes, bits, or some other form of network and traffic data over a period of time. As mentioned, the communication data from each terminal can include, for example, local (e.g., communication between client devices and terminal) bytes received, local bytes sent, satellite network (e.g., communication between terminal and satellite) bytes received, satellite network bytes transmitted, and terminal available memory, among other things. The period of time can include, for example, a past hour, a past day, and a past month. Other time periods are also possible.

As illustrated in system 100, the communication data 106-1 can include the following data sets. Over a period of 1 day, for example, the communication data 106-1 can include a monitoring load of 5 megabytes (MB), local bytes received of 10 MB, local bytes sent of 50 MB, satellite bytes received of 15 MB, satellite bytes sent of 16 MB, and packet sent errors of 10 MB. The communication data 106-1 can also include other fields defined for each terminal. Communication data 106-2 and 106-N can include similar data fields with their respective values or levels of network traffic over their own respective periods of time. For example, communication data 106-1 can include these data values over a period of 1 day, communication data 106-2 can include these data values over a period of 1 hour, and communication data 106-N can include these data values over a period of 1 day.

In some implementations, the server system 116 can provide each communication data 106-1 through 106-N (collectively, "communication data 106") to the idle scoring module 118. The idle scoring module 118 can generate a series of scores for each device using the input communication data 106 from each terminal or each device. For example, the series of scores can include one or more data structures or scores that correspond to different time periods in a series of time periods and include values that describe network traffic over a corresponding time period. The length of each score can be N units long, where N is a predefined number based on a design implementation. Each score can be a data structure such as, an array, a vector, a row, a struct, and the like.

As illustrated in system 100, the idle scoring module 118 can generate a series of scores 109 for each communication data 106 from each terminal. For example, the idle scoring module 118 can generate a series of scores 109-1 for terminal 102-1, a series of scores 109-2 for terminal 102-2, and a series of scores 109-N for terminal 102-N. In the series of scores, the idle scoring module can identify as a score with a particular index. The index $d_0$ through $d_N$ can correspond to identifiers for a particular data structure. Each column in the data structure can correspond to a unit of time. For example, in data structure $d_0$ of the series of scores 109-1, 1 MB was measured at the first time unit, 2 MB was measured at the second time unit, 3 MB was measured at the third time unit, and 4 MB was measured at the fourth time unit. The units of time can correspond to seconds, minutes, and hours, for example.

The idle scoring module 118 can generate the series of scores 109 for each terminal by segmenting communication data 106 into defined periods. For example, the idle scoring module 118 can identify that the communication data 106-1 corresponds to communication data over a one month. Then, the idle scoring module 118 can segment the communication data 106-1 into daily scores 109-1. The daily scores 109-1 can include a score or data structure for each day, e.g., 28, 30, or 31 scores depending on the month. In other examples, the idle scoring module 118 can segment the communication data 106-1 on other defined periods. The other defined periods can be, for example, a size limit for each score, e.g., 30 units per score, a whole number of scores that the communication data 106-1 time period can be equally divided into, e.g., communication data 106-1 includes 1000 data points that can be divided into 10 equal scores of 100 units long each, and a number of series set by an implementer. In other examples, the idle scoring module 118 can generate one long score that includes the entirety of the communication data 106 for a particular terminal. After generating the scores for each terminal's corresponding communication data, the server system 116 provides each of the series of scores 109 to the next process for generating the training data before training the machine learning model.

Figure 1B:
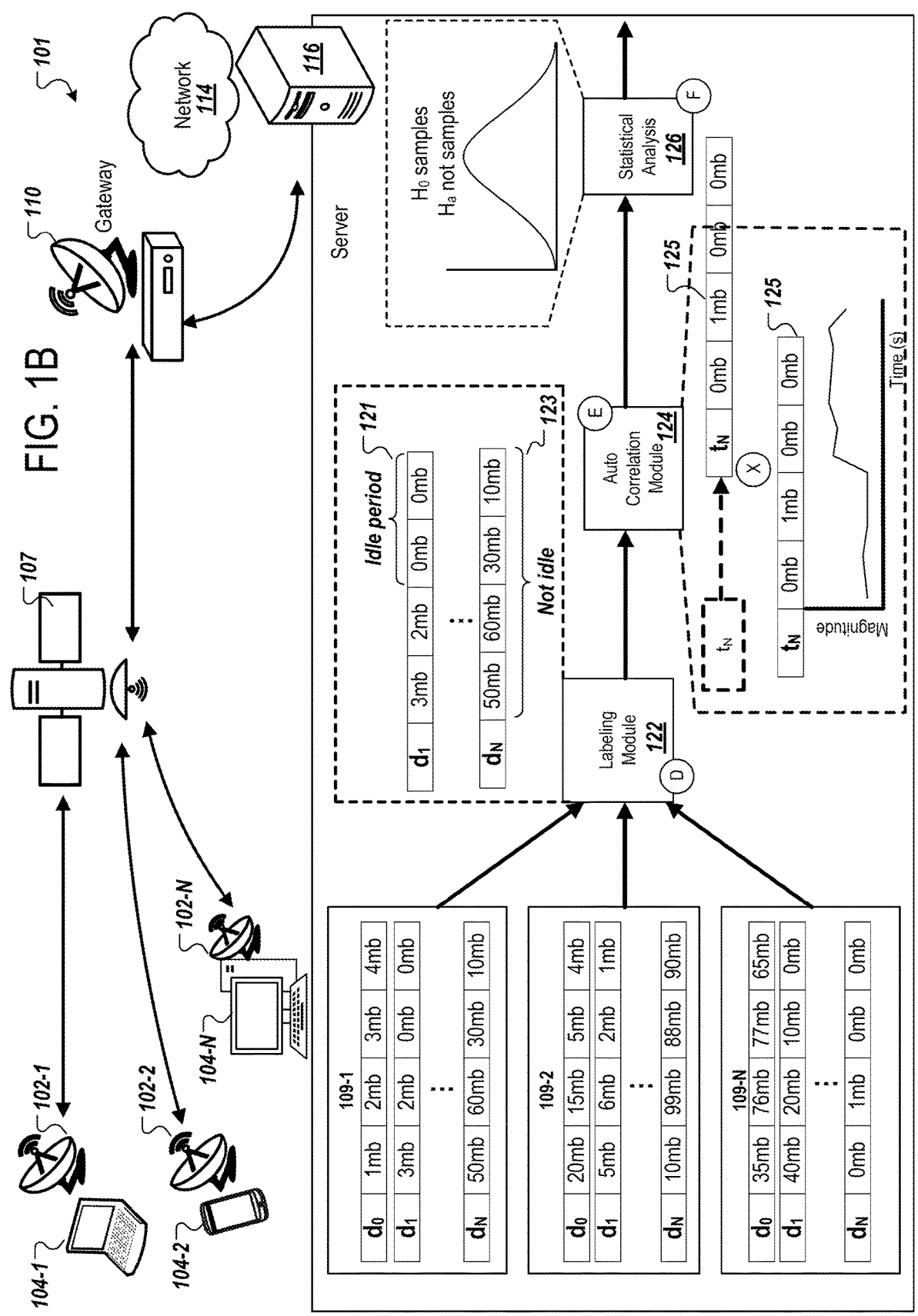

FIG. 1B is another block diagram that illustrates an example of a system 101 for performing efficient maintenance in satellite terminals. System 101 is a continuation of system 100 from FIG. 1A. FIG. 1B illustrates various operations in stages (D) through (F) which can be performed in the sequence indicated or in another sequence.

During stage (D), the server system 116 provides each of the series of scores 109 to a labeling module 122. In some implementations, the labeling module 122 can generate and mark periods in the series of scores 109 as idle. The labeling module 122 can generate these labels and apply these labels to certain time units in each score of the series of scores 109. For example, the labels can include indications of idle periods within a score and indications of non-idle periods within the score. As previously mentioned, the idle period can be defined in a number of ways and correspondingly labeled in each score. For example, the idle periods can correspond to a time period of disconnect between a client device and a terminal, a time period in which an active connection between a client device and terminal exist but no communication exist, a time period in which a terminal is off, and/or a time period in which the client devices are turned off.

The labeling module 122 can receive each series of scores 109 and identify the idle and non-idle periods in each of the scores. For example, the labeling module 122 can search for values of zero in each of the scores and generate a label of "IDLE" for this particular data structure at this index within the data structure. In other examples, the labeling module 122 can search for values in each score that are below a threshold, such as below 1 kilobyte (KB) or 1 KB/s to indicate an "IDLE" period. Additionally, the labeling module 122 can identify values of non-zero in each of the scores and generate a label of "NON-IDLE" for the particular data structure at the identified index within the data structure.

In other implementations, the labeling module 122 can analyze each of the scores or data structures in the series of scores 109 before applying the labels. The labeling module 122 can generate metrics to apply to each data structure in the series of scores 109. The metrics can be reflective of patterns found within each of the scores. The patterns can include, for example, network patterns that lead to patterns of idle times, network patterns that follow patterns of idle times, network patterns indicative of patterns of idle times, and network patterns of non-idle times.

Based on how likely one of these traffic patterns is identified in each data structure, the labeling module 122 can generate and assign a corresponding score or value to each of the data structures in the series of scores 109. For example, if a traffic pattern of idle time is identified in a data structure, the labeling module 122 can associate a higher score or value with that data structure of the series of scores, e.g., such as data structure $d_0$ within series of scores 109-1. Alternatively, if a traffic pattern of non-idle time is identified in a particular data structure, the labeling module 122 can associate a low score with that data structure. The scores generated by the labeling module 122 can indicate to the machine-learning model during training which data structures within the series of scores should be weighted more heavily than others. The higher the score associated with a particular data structure, the higher weight given and applied by the machine-learning model. Additionally, if the labeling module 122 identifies a traffic pattern of network activity leading up to idle times or identifies a traffic pattern of network activity following idle times, then the labeling module 122 can apply a medium score, e.g., 50%, to the corresponding data structure.

The labeling module 122 can also seek to identify traffic patterns in each data structure of the series of scores 109 and generate a corresponding score or metric for that data structure. The labeling module 122 can identify traffic patterns in each of the scores by identifying, for example, a rise in bytes, a fall in bytes, zero bytes, or some other change in bytes indicative of idle or non-idle time. For example, for the data structure $d_0$ from the series of scores 109-1, the labeling module 122 can determine that the amount of MB being detected is increasing for each time unit (from 1 MB to 4 MB), thus, this data structure $d_0$ does not have an idle time or show a decrease in value to indicate an idle time is upcoming. Thus, the labeling module 122 can assign a low weight value of 5% for this data structure $d_0$.

In another example, the labeling module 122 can receive data structure $d_1$ from communication data 109-1, and identify a fall in bytes between time unit one and time unit two followed by idle times at time unit three and time unit four. Consequently, the label scoring module 122 can assign a high weight value of 90% to data structure $d_1$ of communication data 109-1. In another example, the labeling module 122 can assign a score of 2% to data structure $d_N$ of communication data 109-2 because the amount of data in each time unit is high and does not appear to fall down to an idle time. However, the labeling module 122 can assign a high score of 98% and 99% respectively for data structure $d_1$ and $d_N$ of data traffic 109-N. In the former, the labeling module 122 can identify a falling trend in bytes with an idle time identified in the fourth unit of time. In the latter, the labeling module 122 can identify various idle periods in time, such as at time units one, three, and four.

To speed up the process of identifying "IDLE" vs "NON-IDLE," the labeling module 122 can first scan through the scores of each data structure and process the data structures first with scores that are higher than a predetermined threshold, such as 75%, for example. The labeling module 122 can determine from the scores which data structures have the highest likelihood of idle periods. In some implementations, the labeling module 122 can discard data structures that are below a predetermined threshold, such as 10%. These data structures with scores below a predetermined threshold may not be beneficial as training data, as the goal is to use training data with defined idle periods. However, it may be helpful, in some cases, to have data structures with both idle and non-idle periods, so during training, the machine-learning model can distinguish between these two types of events during training. Additionally, having data structures that show trends of data that lead towards idle periods or lead away from idle periods can aid the machine-learning model in predicting future idle periods. This will be further described below.

As illustrated in FIG. 1B, the labeling module 122 can identify an idle period 121 within data structure $d_1$. Additionally, the labeling module 122 can identify a non-idle period 123 associated with the entirety of data structure $d_N$. The labeling module 122 may also identify a non-idle period in the two time units before the idle period 121. In particular, the labeling module 122 can generate a data structure that indicates for data structure $d_1$ time slots three and four correspond to an "IDLE" period and time slots one and two correspond to a "NON-IDLE" period. The labeling module 122 can perform this labeling for each data structure received.

During stage (E), the labeling module 122 provides each of the scored data structures and the corresponding labeling data structures to the auto-correlation module 124. The auto-correlation module 124 can perform an auto-correlation between a data structure and a time-delayed version of itself. For example, in order for the machine-learning model to more accurately predict the idle time, the machine-learning model is required to understand the relationship between various input parameters that can affect the determined idle time for a particular terminal. The auto-correlation can help determine the interdependencies and co-movements among the input variables of each data structure. For example, the auto-correlation may help determine a time-delayed relationship between local network bytes transmitted and satellite network bytes received, such that an idle period can be determined when these two variables follow a decreasing byte usage pattern. In another example, the auto-correlation can help determine that an idle period is predicted to happen when terminal healthy status is high and terminal no-connect duration is high. In another example, the auto-correlation can be performed to select which types of data variables are most related to the idle state that is desired to be predicted. Additionally, the variables within a data structure may be time-dependent, have a dependency with one another, and depend on their past values. Other co-dependencies between variables may possibly help determine a predicted idle time.

The server system 116 can apply the auto-correlation in the auto-correlation module 124 to detect non-randomness in each data structure. As illustrated in system 101, the auto-correlation module 124 performs an auto-correlation between data structure 125 and a time-delayed copy of itself. Said another way, the auto-correlation module 124 performs an auto-correlation between data structures 125 and a time-delayed version of the data structure 125. The time-delayed version of the data structure 125 can be delayed by a particular time amount, such as 1 microsecond, 10 microseconds, 1 millisecond, 30 minutes, 1 hour, 2 hours, etc., to name a few examples. These "lags" or time delayed versions of itself are analyzed at a granular level on a periodic frequency basis, hour-by-hour or other time periods. The result of the auto-correlation includes various magnitudes at different times. The magnitudes indicate non-random movement and a direct connection between one or more variables in the data structure 125. For example, the dependencies of a particular terminal's "idle time" with the terminal's uplink and downlink performance, e.g., outage and degradation, may have a correlation with the particular terminal's idle time determination. For example, the correlation may be positive, which indicates that an increase of the variable in one time series can lead to a proportionate increase in a subsequent or another time series. If the correlation is negative, then a decrease of the variable in one time series can lead to a proportionate decrease in a subsequent or another time series. The auto-correlation can provide correlations between other variables as well, such as idle time, outroute available percentage, and other usage statistics, to name a few examples. The server system 116 can provide the results of the auto-correlation module 124 for each data structure to the statistical analysis module 126.

During stage (F), the statistical analysis module 126 can receive the results of the auto-correlation module 124 for each data structure. The results of the auto-correlation can include samples within a magnitude versus time plot. The correlation between two or more input variables within a particular data structure is strong when the magnitude is high. The correlation between two or more input variables within a particular data structure is weak when the magnitude is low. Thus, two or more input variables are said to be dependent when their correlation is high. For example, an auto-correlation result of one can represent a perfect positive correlation which means, an increase seen in one time series leads to a proportionate increase in the other time series.

In some implementations, the statistical analysis module 126 can apply one or more additional statistical processes to the resultant correlated data for each data structure. For example, the statistical analysis module 126 can ensure the resultant correlated data includes a normal or Gaussian distribution of the data. The statistical analysis module 126 can determine whether the resultant correlated data has a normal or Gaussian distribution by performing a normality test based on the Null and Alternate Hypothesis institution. For example, the statistical analysis module 126 can apply the Null and Alternate Hypothesis institution to test whether two variables, e.g., local network bytes received and satellite network bytes transmitted, are correlated. Other tests for other variables are also possible.

For example, the statistical analysis module 126's uses hypothesis testing to draw conclusions about an entire population based on a representative samples. In particular, the statistical analysis module 126 applies hypothesis testing to the results of the correlated data to determine whether the data follows a normal distribution or another distribution. If the results of the correlated data follows or can be modeled with a distribution, then the statistical analysis module 126 can indicate the data will be useful as training data and aid the trained model in predicting future idle times. If the results of the correlated data do not follow or cannot be modeled with a particular distribution, this data may be discarded as the data would not be well fitted to be used as training data for the predictive model.

The hypothesis testing relies on an alternate hypothesis, which determines whether the data is normally distributed, and a null hypothesis, which determines whether the data is non-Gaussian or does not follow a normal distribution. Normal distributions typically indicate that the data is likely to be accurate and more useful to improve the predictability of the models. Generally, the statistical analysis module 126 seeks to disprove the null hypothesis, e.g., seeks to disprove that the data is non-Gaussian or is not normally distributed, by analyzing the p-value representations. In this regard, a p-value corresponds to being in favor of either the null hypothesis or the alternate hypothesis. A smaller p-value indicates that stronger evidence exists for the alternative hypothesis, whereas a large p-value indicates stronger evidence exists for the null hypothesis. The statistical analysis module 126 can analyze the normal distribution of the resultant correlated data, such as fair access tokens, e.g., data allowance, used over a period of time and the satellite network bytes transmitted. If the statistical analysis module 126 determines that the p value is greater than an alpha value of 0.05, for example, meaning that the p value has a 95% confidence, then the statistical analysis module 126 can indicate that the resultant correlated data follows a Gaussian distribution, meaning the samples of data included within the input time series is well fitted to be predicted by the machine learning models.

In some cases, the statistical analysis module 126 ensures the resultant correlation matches to a normal or Gaussian probability distribution, because these distributions can be used to compute the probability of obtaining the sample statistic. If the probability of obtaining a sample is very low, the statistical analysis module 126 disregards the null hypothesis because a rare sample exists, given the assumption that null hypothesis is true is incorrect. An odd sample can be mistakenly rejected in the null hypothesis, when in fact the null hypothesis is true. This is known as a "type one error." In some cases, one way the statistical analysis module 126 controls this error is to choose a significance level, such as between 0.05 and 0.01, if a cost associated with a type one error is high. The lower the significance level, the more stringent the statistical analysis module 126's definition of rarity. For example, the statistical analysis module 126 can use Granger's Causality Test to compare each data structure to one another to determine their corresponding influences.

Said another way, the statistical analysis module 126 can determine whether the p value is greater than the alpha value of 0.05, for example, e.g., meaning the p value holds 95%. If this is the case, the statistical analysis module 126 can indicate that the resultant correlated data follows a Gaussian distribution, which means the data is well fitted to use as training data for the predictive models. Sometimes, the statistical analysis module 126 may encounter outliers in the resultant data which can lead to errors, e.g., errors in training data and ultimately, errors that affect the accuracy of the predictive model. One error, known as a type 1 error, can correspond to a false positive and occurs when the statistical analysis module 126 incorrectly rejects a true null hypothesis. For example, if the statistical analysis module 126 encounters a sample of data in the time series for distribution of transmitted user data is extremely high, e.g., 100 MB verse 250 MB of data in an hour, as compared to the overall transmission around that hour of the day, the statistical analysis module 126 can classify that egregious data sample as a type 1 error, e.g., to indicate that the data is not normally distributed. The statistical analysis module 126 may filter out, disregard, or clean these data values that are egregious. For example, any samples that are more or less than two or three standard deviations from the mean can be discarded or filtered out. Additionally, the statistical analysis module 126 can encounter more than one variable that has high outliers, and as a result, the statistical analysis module 126, can define the tolerance of such samples by defining the significance value, e.g., the alpha value. Thus, in the hypothesis testing example described above, the alpha value is defined to by 0.05. An alpha value of 0.05 or 5% indicates the number of times that the statistical analysis module 126 is incorrect to reject the null hypothesis.

In some implementations, the statistical analysis module 126 can also perform other statistical methods as well to determine dependencies between variables in the data structures. For example, the statistical analysis module 126 can correlate two different data structures from the same series of scores 109, e.g., data structure $d_0$ and data structure $d_N$ from the series of scores 109-1, to determine dependencies between variables. These correlation results can illustrate patterns that show the movement between two variables which can lead to or indicate a pattern of idle time. In some implementations, the statistical analysis module 126 can correlate two different data structures from different series of scores 109, e.g., data structure $d_1$ from series of scores 107-2 and data structure $d_N$ from series of scores 109-N. These relationships can help further illustrate idle periods, non-idle periods, patterns leading up to idle periods, and patterns leading away from idle periods.

The statistical analysis module 126 can also perform transformations to the results of the auto-correlation to make the series stationary. The statistical analysis module 126 can transform the results of the auto-correlation by performing differencing and transformations. The results of the auto-correlation may be referred to as non-stationary if the data includes means, variance, and covariances that change over time. The covariance may be analyzed to see how one data point from the auto-correlation affects the other. The predicted model cannot use non-stationary data because that data may not allow for accurate predictions and model accuracy, e.g., the data may be noisy, which the model cannot use for training. In order to make the non-stationary data more consistent, e.g., converted to stationary data, the statistical analysis module 126 can perform these types of transformations. For example, the statistical analysis module 126 can apply differencing that applies differences to data points in the resultant correlated data. The data may include, for example, 10 MB, 25 MB, 5 MB, and 35 MB over a series of time. The statistical analysis module 126 can apply the differencing to result in a modified data series: 25 MB-10 MB, 5 MB-25 MB, 35 MB-5 MB. At this stage, the resultant values of the data series includes: 15 MB, −20 MB, 30 MB, and 35 MB. If at this stage, the resultant values of the data series exhibit non-stationary properties, the statistical analysis module 126 can apply a second difference to the resultant values of the data series to make the data series more stationary. This method helps the VAR model and the LSTM RNN model avoid learning relationships with erred data.

The statistical analysis module 126 can also analyze the terminal rate in megabytes per second (Mbps) over the satellite link (transmit and receive rate in Mbps), backbone status over time, the downlink lock/unlock duration over time, and uplink frame negative acknowledgements (NAKs) over time. The backbone status over time can refer to the reliable transmission connection status (TCP) of the terminal to the corresponding gateway, e.g., gateway 110. The gateway can execute one or more protocols that relate to the reliable transmission of packets, which ensures error recovery through acknowledgements of missed packets of data, on the Internet over the satellite network. For example, the backbone status over time can handle TCP messages that have a one way delay between the terminal and the gateway 110 with a delay of about 260 ms. Typically, the backbone status can be connected between the terminal and the gateway using two TCP connections used in the end-to-end link. A TCP connection exists at the terminal end and at the gateway 110. The backbone status can be a performance enhancing protocol prioritizes service for streaming and interactive communications between a terminal and the Internet. The backback bone service can prioritize traffic based on models, IP addresses, data types, and can classify and assign a Quality of Service (QOS) level.

The downlink lock/unlock duration can refer to the establishment of a data path for data flowing from the gateways, e.g., gateway 110 and other gateways, to the terminal devices. The downlink lock/unlock duration is also referred to as the "outroute." In some examples, when a remote terminal is first powered on, the remote terminal first establishes a "lock" to the corresponding satellite data path. The lock/unlock duration refers to the amount of time the terminal remains established to the outroute data path over time. The uplink frame NAKs over time corresponds to the number of negative acknowledgements received over a period of time when a terminal transmits to the satellite and the transmission fails. The statistical analysis module 126 can analyze each of these additional characteristics to determine an effect on the VSAT idle time. The statistical analysis module 126 may correlate each of these values with the data traffic inputs described above to see how the effect they have on idle time. The resultant correlations, auto-correlations, and statistical analysis are then provided to the preprocessing module 128.

FIG. 1C is another block diagram that illustrates an example of a system 103 for performing efficient maintenance in satellite terminals. System 103 is a continuation of system 101 from FIG. 1B and system 100 from FIG. 1A. FIG. 1C illustrates various operations in stages (G) through (I) which can be performed in the sequence indicated or in another sequence.

In system 103, the statistical analysis module 126 can provide the resultant statistical data, e.g., correlated data, auto-correlated, and other statistical results, to the preprocessing module 128. The statistical data 127-1, statistical data 127-2, and statistical data 127-N (collectively "statistical data 127") can correspond to the statistical data from each of the terminals 102-1, 102-2, and 102-N, respectively. In some implementations, the statistical data 127 can correspond to the time series forecasting data. The time series forecasting data illustrates the results of the heuristically processed analysis on the data structures provided by each of the terminals 102.

As illustrated in FIG. 1C, statistical data 127-1 (or time series forecasting data 127-1) includes data showing a plot of auto-correlated data for a particular data structure from terminal 102-1. Similarly, FIG. 1C includes statistical data 127-2 of an auto-correlated plot data for a particular data structure from terminal 102-2, and statistical data 127-N includes an auto-correlated plot data for a particular data structure from terminal 102-N. Each of these data structures may also include auto-correlated plot data for each data structure from the corresponding terminal, correlated data between various data structures, other statistical modeling representative of patterns of idle times. Each of the statistical data 127 also includes labels of idle periods and non-idle periods generated by the labeling module 122.

Before the server system 116 can properly train the machine-learning model, the server system 116 can preprocess the training data to clean and filter unnecessary and superfluous training data. During stage (G), the server system 116 can provide the statistical data 127 to the preprocessing module 128 for fine-tuning before providing the data to the training module 130. For example, the server system 116 includes a preprocessing module 128 that can perform a variety of pre-processing functions on the statistical data 127. The pre-processing functions can include, for example, extracting relevant data using start and stop times, dropping statistical data that is irrelevant and does not include "IDLE" times, correcting some of the statistical data to account for uniform units, and determining relevant features from the statistical data. In other examples, the pre-processing functions can also perform statistical data alignment, filtering of statistical data that do not show characteristics of traffic patterns that lead to or follow an idle period, and saving off the statistical data for training the machine-learning model at a later point in time.

In some implementations, the preprocessing module 128 can identify the top measured properties from the statistical data 127 and exclude the statistical data that does not exhibit these properties. The preprocessing module 128 may select the top five to ten measured properties, for example, and identify data structures and corresponding statistical data that exhibit those properties to be used as the training data. For example, the measured properties can include relationship between local bytes sent and local bytes received, relationship between terminal no-connect duration and terminal packet send errors, and the like. The preprocessing module 128 can filter through the statistical data and the data structures that exhibit these relationships and correlations, extracting the data that meets these criteria, and provide the data meeting the criteria to the training module 130.

In some implementations, the server system 116 can provide each statistical data 127 to the preprocessing module 128. The preprocessing module 128 can apply one or more of the preprocessing functions mentioned above to each of the statistical data 127 for fine-tuning before training of the machine-learning model. In some implementations, the preprocessing module 128 can process each of the statistical data 127 in a serial manner or in a parallel manner depending on the tradeoff between complexity, speed, and accuracy of results. The preprocessing module 128 can output the preprocessed data for each statistical data 127 and provide the pre-processed data serially to the training module 130.

During stage (H), the preprocessing module 128 can provide the pre-processed data to the training module 130 for training a machine-learning model. The machine-learning model can be trained to predict an idle time at a particular terminal using network and data traffic inputs. The training module 130 can train the machine-learning model using one or more techniques with the pre-processed data.

In some implementations, the machine-learning model, e.g., the idle period forecasting model, can include a Long Short Term Memory (LSTM) Recurrent Neural Network (RNN). The training module 130 can improve the training and ultimately the prediction of idle time with the use of a Vector Auto Regression (VAR) model. The VAR model can accept the inputs of the pre-processed data and provide its output as input to the LSTM RNN. The VAR model can generate additional training and testing data from the time series forecasted pre-processed data. The output of the VAR model can correspond to future observations of potential idle times.

In some implementations, the VAR model can predict if one or more of the input parameters in the time series forecasting data depend on one another. In particular, the VAR model can determine whether the parameters from the pre-processed data are not completely unbiased and correlated to the statistical data 127. Typically, the parameters in the time series forecasting data is a function of past lags of items and past lags of other variables. Each lag can include a delay in which a change in one variable produces a change in the same variable at a later point in time.

The LSTM RNN model can be trained to predict the idle time at each terminal or device. The LSTM RNN model can retain long-term dependencies using feedback connections, storing information in a cell with an input, output, and one or more forget gates. For example, the LTSM RNN can receive information from the VAR model as input, and can maintain an internal state about the connection between various cells. The LSTM model can analyze a segment of the time series data to predict activity at a future time period, such as an hour or minute in the future. This internal state can then be used to extract information, e.g., a prediction as indicated by output at an output layer of the LSTM RNN model, such as a prediction of an idle time for a terminal. An example of an LSTM RNN model will be further illustrated and described below.

In some implementations, the VAR model relies on the past value of each variable indicates from the time series data to be able to make predictions about the future. For example, the training module 130 can use a multiple time series data and extract information from their relationships to form a multivariate generalization using the relationships of several of the inputs. For the training module 130 to develop an accurate VAR model, the training module 130 relies on time series datasets that are stationary and leverage autocorrelation behaviors. The prerequisites of the time series datasets enable the training module 130 to develop a stable and accurate VAR model.

The training module 130 relies on the VAR model's internal behavior of learning of the multivariate data source that provides the fitted values. In particular, the training module 130 trains the VAR model to remove extremely deviant or egregious values, correct anomalous trends, and reconstruct missing values before providing the output of the VAR model to the LSTM model. The LSTM models requires clean and accurate data from the VAR model to accurately predict values.

In some implementations, the training module 130 feeds the data output from the VAR model to the LSTM model in a two-step training procedure. First, the training module 130 feeds the LSTM model with the fitted values output from the VAR model, then concludes the training by providing the LSTM model the raw data, the raw data corresponds to the same inputs used to train the VAR model. The inputs used to train the VAR model can correspond to the differential data transformed from the statistical analysis module 126 and preprocessed from the preprocessing module 128. Additionally, the training module 130 can provide data from external data sources that can improve the prediction of the LSTM model's idle time prediction.

The VAR model can predict properties of traffic for an upcoming time period. The LSTM model is a deep learning model that receives input of (1) the output of the VAR model, and (2) the input time series data. The input of the VAR model can correspond to the time series data or differential time series data on a measured periodic basis, e.g., hour by hour or minute by minute, to name a few examples. For example, the VAR model can receive input time series vectors t1, t2, and t3, and predict the most likely values of the vector for t4, which each vector corresponds to a subsequent period of time and network data associated with the time. If data traffic sent in prior periods were (20 MB, 30 MB, and 40 MB), then the VAR model may predict the next period of transmission data to be 50 MB. In effect, the VAR model helps interpret or summarize the input data for the LSTM model, guiding the LSTM model with a predicted "next" measurement in the sequence that is expected to occur. The VAR model can output the predicted future data amounts for the measured data types. For example, the VAR model can output for a single time or for multiple future time periods.

In some implementations, the LSTM model receives as input, the most recent output of the VAR model. The most recent output of the VAR model corresponds to a predicted traffic characteristics of the upcoming time period. Additionally, the LSTM receives an input of most recent actual measured traffic characteristics (same input as provided to the VAR model). In some cases, the LSTM model can be retrained to use additional inputs different from those of the VAR model. The LSTM model can output predictions of idle time for the next day. For example, the output can include a score the indicates how likely a time period corresponds to being idle, for each of multiple future time periods. An example output vector can correspond to [0.5, 0.9, 0.2]. The example output vector means that a 50% likelihood that the next hour is idle, a 90% likelihood exists that the $2^{nd}$ hour is idle, and a 20% likelihood that the third hour is idle. Other outputs are also possible.

In other examples, the VAR model can output idle times prediction on particular dates in a vector. For example, the output vector can include [2:00 AM on June 2, 3:00 AM on June 2, 4:00 AM on June 2, and 5:00 AM on June 10]. The output vector can be provided to the LSTM model as well as the input that was provided to the VAR model. Consequently, the LSTM model can output a vector that can include idle time predictions of [5:00 PM on June 2, 6:00 PM on June 2, 7:00 PM on June 2].

In some implementations, the training module 130 can also retrieve historical time series forecasting data for training the machine-learning model. The server system 116 can store training data for each machine-learning model trained and use the previous training data to train the most current machine-learning model. The training module 130 can use testing data from the statistical data 127 to determine the accuracy and efficiency of the trained machine-learning model. For example, if the training module 130 includes testing data that illustrates an idle period at a particular time, then the training module 130 can provide a portion of data from the testing data to see if trained machine-learning model can predict the idle period at the idle time indicated by the testing data. If the training module 130 determines the trained idle period forecasting model is not able to accurately predict the idle period from the statistical data, then the training module 130 can adjust the characteristics of the trained machine-learning model and can retrain the machine-learning model using statistical and other historical data until the output of the trained machine-learning model matches an idle period found in real statistical data. The training module 130 can iteratively perform this process on the trained machine-learning model using new statistical data and statistical data from the terminals 102 when the trained machine-learning model produces an inaccurate idle time prediction.

During stage (I), in response to training the machine-learning model to produce accurate idle time predictions, the training module 130 can store the trained idle period forecasting model 132 in the trained models database 134. The trained models database 134 can include a number of previous trained machine-learning models that the training module 130 has generated. Additionally, trained models database 134 can include training data that was previously used to train the previous versions and current version of the trained machine-learning models. For example, the training data can include statistical data, such as 100 seconds of auto-correlated network traffic data for a particular terminal, correlated data between different network traffic between multiple terminals, labeled "IDLE" data in the auto-correlated and correlated data, and labeled "NON-IDLE" data in the auto-correlated and correlated data.

The trained models database 134 can include one or more tables that store and organize the training data in an easy to access manner. For example, the trained models database 134 can include one or more tables that include auto correlated training data, correlated training data, communication data included from each of the terminals 102 in system 100, and data organized by the client devices each terminal can communicate with in system 100. One table may include network activity between a terminal and client device when the client device corresponds to a handheld device and another table may include network activity between a terminal and client device when the client device corresponds to a desktop computer. This may be helpful in the case that the trained machine-learning model at a particular terminal is able to predict accurately idle times for handheld devices but not predict idle times for terminals that communicate only with a desktop computer. In this case, the training module 130 can acquire training data including with terminals communicating with a desktop computer from the trained models database 134 to improve the trained models idle time prediction associated with desktop computers. Similarly, the training module 130 can improve the trained model's accuracy for different client devices that communicate with different terminals.

FIG. 1D is another block diagram that illustrates an example of a system 105 for performing efficient maintenance in satellite terminals. System 105 is a continuation of system 103 from FIG. 1C, system 101 from FIG. 1B, and system 100 from FIG. 1A. FIG. 1D illustrates various operations in stages (J) through (N) which can be performed in the sequence indicated or in another sequence.

During stage (J), after the server system 116 has properly trained the machine-learning model, the server system 116 can store the trained machine-learning model 132 in the trained models database 134. Then, at a later point, the server system 116 can obtain the trained machine-learning model 132 from the trained models database 134. The server system 116 can access the trained models database 134 and retrieve the latest trained model based on the latest time the training occurred. For example, each version of the trained model may be stored and indexed by a time that training took place for that model. In this case, the server system 116 can retrieve the most recently trained model, e.g., version four of the trained model 132, and prepare that model to be deployed to the terminals.

During stage (K), after the server system 116 has obtained the trained model, the server system 116 optimizes the model before deployment. The server system 116 can optimize the model before transmitting the models to the terminals 102 because of the amount of memory found at the terminals. In some cases, the terminals 102 may not include an unlimited amount of bandwidth, memory, and processing power, and as such, the trained models need to be stripped or trimmed down to a reduced set of inputs and features to be stored and properly operated at each terminal. In some implementations, the server system 116 can query each terminal of the terminals 102 to request for processing power, bandwidth, and memory capabilities. In other implementations, the server system 116 can store a preconfigured bandwidth, memory, and power required at each terminal for a newly trained model.

In some implementations, a tradeoff exists in which the server system 116 must decide between accuracy of the trained models' predictions and processing speed, bandwidth, and memory limitations at the terminals. For example, the server system 116 may strip down the number of inputs required to be input to the trained model in order to reduce the processing complexity and memory constraints required to use the model at each terminal. However, the server system 116 cannot strip down the model and its inputs to a point where output accuracy is degraded sufficiently. For example, the server system 116 can strip the models based on the type of models running at the terminal. The type of models running at the terminal can include just the VAR model, a VAR-LSTM model, or only LSTM models. Since the LSTM is based on a Recurrent Neural Network (RNN) of deep learning, the general computing power required to perform predictions may be higher for higher accuracy. Additionally, depending on the complexity of the models, the number of time series inputs used to model and generate an idle prediction can be removed. For example, in the training module 130 trained a model with fewer lags of data, such as 50 hours of past data instead of 100 hours of past data, The lags of data can include data variables such as, terminal transmission usage, outroute availability, and VSAT free memory availability, for example. The training module 130 may train another module with 100 hours of past data. The lags of data can include data variables, such as, terminal transmission usage, outroute availability, VSAT free memory availability data points. If the two models, both trained with different lag amounts, yield similar results, then the server system 116 can select the latter model with fewer lags for pushing down to the terminals. Thus, the server system 116 may continuously adapt the model's inputs and features to determine a stripped down trained model that still produces accurate results yet meets the memory and processing speed requirements dictated by the terminals 102.

In some implementations, the server system 116 may remove a feature from the trained model 132 and test the efficacy of the new model. First, the server system 116 can obtain the trained model 132, and provide training data to the model and record its predicted idle time. Then, the server system 116 can remove one input or one feature, e.g., a hidden layer or cell, from the trained model, and provide the same training data to the model and determine the predicted idle time. The server system 116 can compare the predicted idle time to the predicted idle time with one feature removed from the trained model. If the difference is within a predetermined threshold, and the size of the newly stripped down model fits the memory and processing requirement of the terminal, then the server system 116 can deploy the newly stripped down model. On the other hand, if the server system 116 determines the stripped down model does not produce a predicted idle time within the predetermined threshold, then the server system 116 can add that stripped feature or input back to the model and remove a different feature from the model, and produce a new predicted idle time output using the same training data. If the server system 116 determines after stripping the model of one or more features that the size of model still does not meet the memory and processing requirements of the terminal, then the server system 116 can remove one or more additional features/inputs until the trained model's size meets the terminals' memory and processing requirements and the model can still produce an accurate predicted idle time.

During stage (L), the server system 116 can perform a simultaneous push of the newly trained and optimized machine-learning model 135. In some implementations, the server system 116 can perform a distribution or deployment of the optimized model 135 to each of the terminals 102 on a periodic basis. Each time the server system 116 receives data traffic from one or more of the terminals 102, the server system 116 can execute the stages (A) through (K) and distribute the newly optimized models to the terminals 102. For example, the server system 116 may update each model periodically, on a daily, weekly, or monthly basis.

In some examples, the server system 116 may use a multicast technique or protocol to transmit the optimized model 135 to each of the terminals 102. In some implementations, each terminal receives the same optimized model 135. The server system 116 pushes the same optimized model 135 to each terminal so the terminals 102 can predict idle times with the model that has been trained by training data from each of the terminals. The server system 116 transmits the optimized model 135 to each of the terminals in one simultaneous push in order to reduce the amount of bandwidth required for updates. Satellite network bandwidth can be expensive and require a large number of resources. By minimizing the amount of satellite bandwidth required for model updates, the server system 116 can transmit periodic model updates with minimal demand of satellite network resources.

During stage (M), the server system 116 transmits the optimized model 135 to the gateway 110 over the network 114. The gateway 110 receives the optimized model 135 and pushes the optimized model 135 to each of the terminals 102 over the satellite 107. Based on the satellite 107's random movement and positioning around the globe, each terminal may receive the optimized model 135 at different times.

During stage (N), each terminal can receive the optimized model 135 and can store the optimized model 135 in memory. In some implementations, each terminal can receive the optimized model 135 as another data representation. For example, the gateway 110 may provide the optimized model 135 as a software image, like an optical disc image, e.g., an ISO image. When a terminal receives the ISO image, the terminal can mount and activate the optimized model 135 at the terminal by mounting the ISO image and making the ISO image available for use.

However, to avoid any disruptions to the client devices connected to the terminal, such as client device 104-1 connected to terminal 102-1, the terminal 102-1 will not update the previous machine-learning model with the optimized model 135 until an idle period has occurred or been predicted. In some implementations, the terminal 102-1 may perform a time series forecasting analysis as described below to generate a predicted idle time. In response to generating the predicted idle time, the terminal 102-1 can replace the previous model with the optimized model 135 for future idle time predictions. By replacing the previous model with the optimized model 135 at the predicted idle time, the down time interruption to the client devices connected to the terminals can be reduced or eliminated through this process.

In some implementations, the terminal can monitor the network traffic and usage statistics between the terminals, the connected client devices, and communication with the satellite. As mentioned, each terminal can track the following data traffic regarding connectivity with each of its connected client devices over a period of time: terminal monitoring load seconds, local network bytes received, local network bytes transmitted, satellite network bytes received, satellite network bytes transmitted, outbound unavailability percentage on a periodic basis, e.g., hourly daily, packet transmission errors, terminal no-connect duration, terminal healthy status time, and terminal available system memory. The period of time can include, for example, 10 seconds, one minute, one hour, or a day, to name a few examples. As each terminal acquires this traffic data, the terminals can push this data to the server system 116 for updating the machine-learning model.

As illustrated in system 105, the terminal 102-1 can acquire data traffic 136-1 and store the data traffic 136-1 with identifiers for each particular data structure. For example, terminal 102-1 can acquire network traffic between itself and client device 104-1 and generate series of scores to store various data structures (similar to the process of stage (C)). In one example, the series of scores for terminal 102-1 can include data structures $d_0$, $d_1$, through $d_N$. The data structure $d_0$ can include values of 1 MB, 2 MB, 3 MB, 4 MB, and so on, at each time unit. The data structure $d_1$ can include values of 3 MB, 2 MB, 0 MB, 0 MB, and so on, at each time unit. The data structure $d_N$ can include values of 50 MB, 60 MB, 30 MB, 10 MB, and so on, at each time unit.

In some implementations, the terminal can provide the generated data structures to the feature generation module 138. The feature generation module 138 can generate features from the received data structures for providing to the optimized model 135. For example, the generated features can include time series forecasting data from the generated data structures.

To generate the time series forecasting data, the terminal can generate a series of scores from the obtained communication data. Then, the terminal can label the portions of each data structure within the series of scores with an IDLE and a NON-IDLE marking. In some cases, the terminal may drop one or more of the data structures if a data structure does not include an IDLE marking. After marking the IDLE periods in the data structures, the terminal can create the time series forecasting data by correlating the IDLE labeled events together between the different data structures as a function of time. Additionally, the terminal can auto-correlate the scores with a past lagged version of itself to determine interdependencies between the variables of the scores. Consequently, the terminal can create a historical data pattern that illustrates idle periods over a set period of time. The auto-correlations can help indicate the variables in the data traffic and their interdependencies that causes the idle periods, and ultimately, enable the optimized model to predict when future idle periods can occur. Said another way, the auto-correlations can help indicate user behavior at the client device that ultimately show idle periods in user traffic with the terminal.

The feature generation module 138 can additionally perform other context relevant functions for identifying idle periods in the time series forecasting data. For example, the feature generation module 138 can compare the data in the correlations to significance or confidence thresholds to determine whether to include the data as input to the trained model. If the idle period correlation magnitude is not above a certain threshold level, then the feature generation module 138 can drop that score set.

Once the terminal generates the time series forecasting data in the feature generation module 138, the terminal can provide the time series forecasting data to the optimized model 135. In some implementations, the terminal can repeatedly generate feature vectors and input the generated feature vectors to the optimized model 135 on a periodic basis. For example, the periodic basis can include every 5 seconds, every minute, every hour, or some other time frame, depending on the implementation of the terminal. In response to providing the optimized model 135 the feature vectors, the terminal can obtain the output from the optimized model 135.

The optimized model 135 can provide several different outputs. Generally, the optimized model 135 can indicate in the output when or whether an idle time is suitable for maintenance. As mentioned, the optimized model 135's output is based on the behavior patterns of the network activity of the client devices. In some implementations, the optimized model 135's output can correspond to a prediction of idle time at a current time, a future time, and include a predicted duration of the idle time.

In some implementations, the optimized model 135's output can include an indication of whether a present or current time is a predicted idle time. The optimized model 135 can indicate that the current time is a sufficient idle time based on sufficient confidence and idle period duration to perform a particular type of maintenance, e.g., software/hardware update, reboot, without disrupting service to the connected client devices. The classification that the current time is indicative of a predicted idle is not a momentary idle time, but rather, a duration of sufficient length to allow for the particular type of maintenance, e.g., software update, reboot, or hardware update/replacement. For example, the optimized model 135 can determine the idle time's duration based on various patterns observed from a certain number of time forecasting series data vector inputs. As previously discussed, these patterns may include relationships between variables that lead to previous idle periods, indications of previous idle events and network traffic events that lead up to and follow the previous idle events, as well as periods of non-idle time for differentiating between periods of idle time, to name a few examples.

For example, the optimized model 135's output can indicate that now, e.g., 12:01 PM, is a sufficient time for idle time and indicate that the idle time can last for a duration of 5, 10, or 15 minutes to ensure that a software update or reboot can be performed. In some cases, the optimized model 135 can output a probability or likelihood that the current time, e.g., 12:01 PM, is a sufficient time for idle time and can indicate that the idle time can last for a particular duration. For example, the optimized model 135 can indicate a probability of 60%, 70%, or 80%, to name a few examples, that the current time is sufficient for idle time and that the idle time will last for 6 minutes. If the percentage is below a threshold, e.g., 40%, then the terminal can wait until the optimized model 135 outputs another prediction before performing any maintenance.

In some implementations, the optimized model 135 can output a prediction whether there will be an idle time at some fixed time in the future. The prediction can include a confidence score of whether the idle time will occur, such as, 75% confident an idle time will occur or 10% confident an idle time will occur. The prediction can also indicate how far in the future from a current time the idle time is likely to occur. For example, the prediction can indicate that the optimized model 135 is 65% confident that an idle time will occur in 1 hour or 2 hours. Other times from the current time in the future can also be predicted, such as within 5 minutes, 30 minutes, or 5 hours, to name some examples.

The optimized model 135 can also schedule predictions at various times throughout the day. For example, a terminal can indicate that the optimized model 135 is to produce an idle time prediction every hour on the hour for twelve hours. In this manner, an idle time can be predicted for every hour to find the most optimal time, e.g., time that minimizes the amount of disruptions to the connected client devices, to perform maintenance at the terminal. In some implementations, the optimized model 135 can produce an idle time prediction at a certain time for a future time on a scheduled basis. For example, the optimized model 135 can produce an idle time prediction at 12:00 PM for 1:00 PM. Then, at 1:00 PM, the optimized model 135 produces an idle time prediction for 2:00 PM. This process can repeat on a daily or other periodic basis. Other scheduled time predictions are also possible, such as predicting an idle time for 5 minutes out, 10 minutes out, 2 hours out, or even one day out.

In some implementations, the optimized model 135 can output an indication of a prediction of duration of idle time. The prediction of duration idle time can correspond to a length of time that idle time is expected to last. For example, this can include 5 minutes, 30 minutes, 1 hour, and the like. In some cases, the optimized model 135's prediction of idle time duration can be based on previous patterns of idle time lengths. For example, the correlations of the idle time in the time series forecasting data can indicate a length of previous idle times which can aid the optimized model 135 in predicting future idle time durations.

In some implementations, the optimized model 135 can also output a start time and a set time of the idle time in the future. For example, the optimized model 135 can output a specific start time of 2:04 AM and a specific end time of 2:15 AM tonight. The optimized model 135 can also output a confidence score associated with this range of predicted idle time. In some cases, the optimized model 135 can output multiple ranges of predicted idle times each with their own confidence score. The terminal can select the range of predicted idle time with the highest confidence score. The optimized model 135 can also indicate a date that corresponds to this range of idle times, such as today or tomorrow, to enable the terminal to determine when to schedule maintenance.

The optimized model 135 may output one or a combination of the outputs mentioned above. The terminal can tailor the optimized model 135's output to a set of values that work for the type of maintenance to be performed. For example, if the scheduled maintenance takes a short time, then the terminal can indicate to the optimized model 135 to determine whether now (the current time) is a good prediction for idle time, then the optimized model 135 can either indicate a classification of "YES" or "NO" with a corresponding confidence score. In another example, if the scheduled maintenance will require a longer period of time because both hardware replacements and software upgrades are required, the terminal can indicate to the optimized model 135 to output a predicted idle time range in the future that is greater than a time window, e.g., 30 minutes, between 12:00 AM and 4:00 AM. The optimized model 135 can output that between 3:00 AM and 3:35 AM, a predicted idle time is expected with a confidence score of 85%. In this case, the terminal can have the long period of maintenance performed between 3:00 AM and 3:35 AM based the determined predicted idle time.

In some implementations, based on the idle time predicted, the terminal can identify a particular maintenance action to be performed. The particular maintenance action can correspond to a software upgrade, a hardware upgrade or replacement, an operating system upgrade, a software installment, or some other form of upgrade/replacement. The terminal may have a list of maintenance items to be performed. However, to ensure the minimum amount of disruption to one or more connected client devices, the terminal can select the maintenance action that can be performed and completed within the duration of the predicted idle period. For example, if the optimized model 135 predicts a short idle period is expected now, then the terminal can decide to perform a quick software installation as that may require little to no disruption to the connected client devices. In this case, the connected client devices may still be able to communicate with the terminal, e.g., client device 104-1 communicating with terminal 102-1, while the software installation is performed. Alternatively, the terminal may select a more complex and lengthy maintenance action to be performed when the predicted idle period has a longer duration.

In some implementations, the terminal can identify multiple maintenance actions to be performed within an idle period. For example, if the duration period is sufficiently long, the terminal can identify a software upgrade, an operating system upgrade, and other upgrades to be performed, as long as the upgrades can be complete within the idle duration period. Additionally, the terminal can schedule multiple maintenance activities to be performed and completed at multiple times in the future. For example, if the optimized model 135 is instructed to predict an idle time at 1:00 PM, 2:00 PM, and 3:00 PM that same day, and the current time is 10:00 AM, then the terminal can schedule a first maintenance action to be performed at 1:00 PM, a second maintenance action to be performed at 2:00 PM, and a third maintenance action to be performed at 3:00 PM based on the corresponding durations of each of those maintenance actions.

Each terminal can receive instructions from the gateway 110 that include the maintenance actions to be performed and a potential length of time that each of the maintenance actions takes to be completed. For example, the gateway 110 can provide the software updates to be performed at the particular terminal or each of the terminals 102. This can aid the terminal in selecting and scheduling maintenance actions to be performed in tandem with the predictions of idle times and corresponding durations made by the optimized model 135. Additionally, the gateway 110 can rank the importance of maintenance actions to be completed and instruct the terminal to perform and complete the maintenance actions based on the importance rank.

In some implementations, the terminal can carry out and complete the maintenance action at the predicted idle time. For example, as illustrated in FIG. 1D, the optimized model 135 can determine at 12:05 PM there will be a predicted idle time starting at 12:30 PM, starting in 25 minutes, as illustrated in box 140. Additionally, the optimized model 135 can determine that at the predicted idle time starting at 12:30 PM, the duration of the idle time corresponds to three minutes, as illustrated in box 142. The optimized model 135 can also output a confidence score associated with the predicted idle time of 12:30 PM and another confidence score associated with the predicted idle duration of 3 minutes. Based on the predicted idle time and the short predicted idle duration of 3 minutes, the terminal 102-1 can schedule one or maintenance activities at 12:30 PM that can be completed within the three minutes idle duration.

The benefit to the optimized model's prediction is that the maintenance, which may take a few minutes, is not started at a time when a new connection or a maintained connection exhibits throughput. In some cases, the terminal can avoid starting maintenance at these times because the instantaneous or very short-term traffic is zero but there may be frequent small communications that can and will pop up in the future. For example, during the afternoon, the terminal can note that may pockets of inactivity exist, but they are irregular, short, and unpredictable, making it likely that if maintenance were started during this time period, a user request can conflict with the scheduled maintenance. For example, the terminal's optimized model can determine that a 70% chance exists that a user request from a client device may occur over a five-minute period, even if traffic is zero when the idle period is predicted to start. However, at other times, during evening or early morning, the terminal may determine through the optimized model that the idle times are longer, more consistent, and less variable, making the idle times more possible to perform maintenance. This can include, for example, less likely to be conflicting with new requests, such as a 10% chance that a new user request occurs.

In some implementations, each terminal can perform one or more checks before carrying out the maintenance action at the predicted idle time. For example, when the terminal 102-1 determines that 12:30 PM is the time current time and that matches the prediction for the start of the idle time, the terminal 102-1 can then seek to verify whether any active connections between the terminal 102-1 and its connected client devices or between the terminal 102-1 and the satellite 107 are ongoing. If the terminal 102-1 determines at least one active connection is ongoing at this predicted idle time, e.g., such as a 5 Mbit/s connection between terminal 102-1 and client device 104-1, then the terminal 102-1 can cease the scheduled maintenance activity and wait for the next predicted idle time to perform the maintenance activity.

If the terminal, such as terminal 102-1, determines that connectivity is still ongoing at the predicted idle time, the terminal 102-1 can provide data to the server system 116 to indicate that the optimized model 135 needs correction. For example, the terminal 102-1 can combine the data traffic 136-1, the feature data output from the feature generation module 138 that corresponds to the data traffic 136-1, the trained model 135, the prediction of idle time 140 and duration 142, and data traffic that was found at the indicated idle time, e.g., 5 Mbit/s traffic between the terminal 102-1 and the client device 104-1, into a structure to transmit to the server system 116. The terminal 102-1 can transmit the structure over the satellite 107 and the gateway 110 through the network 114 to the server system 116.

If the terminal 102-1 determines that one or more requests from the connected client devices came in during the maintenance activity, then the terminal 102-1 can also gather similar data (to the data mentioned above) and transmit the data to the server system 116 for retraining the model. The terminal 102-1 can determine requests came in during the maintenance activity, such as when the terminal 102-1 is turned off, by checking any requests that were waiting to be processed. In some implementations, the terminal 102-1 can process the waiting requests while submitting the model and corresponding training data to the server system 116 for retraining.

The server system 116, upon receiving the structure, can determine that the optimized terminal 135 has made an incorrect idle prediction. In response to receiving the structure, the server system 116 can retrain the optimized model 135 using the data provided by the terminal 102-1 using the stages from (C) to (I), as discussed with respect to FIGS. 1A through 1C. The server system 116 can continuously train the optimized model 135 until the optimized model 135 avoids producing a predicted idle time at the predicted idle time produced on the terminal 102-1 where the data traffic was found. In response to the server system 116 determining that the optimized model 135 has been sufficiently trained to not predict an idle time at that time, then the server system 116 can perform stages (J) through (K) of optimizing the model 135 and push the newly optimized model 135 to all of the terminals 102. The server system 116 can also optimize the models in a few ways—increasing the data lag value from the VAR models; increasing a size of the training data set; determining improve correlated user data points for prediction; and, adding more layers in LSTM models and increasing the number of epochs.

In another example, as illustrated in FIG. 1D, the optimized model 135 of terminal 102-N can determine at a current idle time of 5:55 PM that a predicted idle time is occurring, as illustrated in box 144. Additionally, this optimized model 135 can determine that the predicted idle time has been predicted to last for five minutes, as illustrated by box 146. The output model 135 can also output a confidence score associated with the predicted idle time classification and another confidence score associated with the predicted idle time duration of five minutes. Thus, the terminal 102-N can determine to carry out the maintenance activity, as illustrated by box 148, of rebooting the terminal 102-N and updating one or more components of the terminal, e.g., software or hardware, with minimal disruption to the connected client devices.

In some implementations, the techniques applied in systems 100, 101, 103, and 105 can also be applied to a bandwidth usage quota depletion system. For example, the terminals 102 can evaluate network usage by an particular end user, such as terminal 102-1 evaluating network usage by client device 104-1, using the time series forecasting data to predict the frequency and periodicity of the bandwidth usage quota depletion. The terminals 102 can monitor network usage for each of their connected client devices to forewarn the customers of the upcoming bandwidth quota depletion event, e.g., an indication that their client devices are close to meeting or exceeding maximum bandwidth for a set time period.

For example, when a client device initially connects to a terminal, a user of the client device may pay a fee for bandwidth usage with a particular terminal. The fee can correspond to an amount of bandwidth the user's client device or client devices have on a regular periodic basis, such as per week or per month. The user may pay $35 for a monthly fee of one terabyte worth of data when communicating with the terminal, for example. In another example, if the user pays for a monthly rate of 10 MB/s with a one terabyte bandwidth quota, then when the user meets or exceeds the one terabyte bandwidth, the system can throttle the speed down to 2 MB/s.

The terminal can monitor the network usage of the client device or client devices associated with the user to determine how close the user is to meeting or exceeding their bandwidth usage. The benefit of predicting ahead for bandwidth depletion ensures the user avoids paying over use or bandwidth depletion fees. Additionally, this prediction method can give the user comfort in knowing that they will avoid hitting the bandwidth depletion and can continue to use the resources offered by the terminal at their desire.

In some implementations, the terminals 102 can use machine-learning models to predict the likelihood of a terminal getting into a "Throttled" state. In the "Throttled" state, the terminal throttles the service plan for the client devices associated with the user. The "Throttled" state is entered when the user exceeds his/her bandwidth allowance limit. In this throttled state, the terminal will reduce the speed and bandwidth at which the user requests for resources at his/her client devices once the threshold limit is hit. The machine-learning model for predicting the bandwidth quota depletion is different from the optimized machine-learning model used for the prediction of idle time. However, the terminals 102 can use similar time series forecasting data for inputting to the machine-learning model associated with the bandwidth depletion events.

The goal of the machine-learning model for predicting the bandwidth depletion events is to be able to forewarn users of their bandwidth usage. For example, if the terminal 102-N can determine that the user of client device 104-N will be refreshing their bandwidth quota in a week, but the machine-learning model predicts that in three days, the user will deplete their bandwidth quota limitation, then the terminal 102-N can provide one or more warnings to the client device 104-N before the end of the three days to ask the user if they wish purchase more bandwidth. In some cases, the terminal 102-N can ask the user if they were aware that they are close to meeting or exceeding their bandwidth quota and recommend steps to reduce bandwidth usages. These recommendations can include, for example, setting a daily limit on the bandwidth usage to not exceed the bandwidth usage before the refresh period, requesting whether the user desires to purchase more bandwidth, or even, stopping usage of the terminal's resources until the refresh period hits to avoid over usage on bandwidth penalty fees. Other recommendations can include whether the user would like to upgrade his/her plan to include more bandwidth so they do not meet or exceed the bandwidth usage before the month's end.

In some implementations, the server system 116 can train the machine-learning model for predicting bandwidth usage depletion and deploy the trained model to each of the terminals 102. The server system 116 can perform the training and deployment for this machine-learning model in a similar process as described with respect to stages (A) through (N) of FIGS. 1A through 1D. Moreover, the server system 116 can measure the amount of network activity taken place by each of the client devices and use that network activity to generate time series forecasting data for training the model. The network activity can be used to define the user's pattern of behavior over a period of time. Once the server system 116 has acquired sufficient network activity that can aid in defining a user's predictable behavior for using data in relation to the user's bandwidth depletion quota, and then the server system 116 can properly train the machine-learning model.

In some implementations, the machine-learning model for predicting the bandwidth quota depletion can include similar components to the machine-learning model for predicting the idle times. For instance, the machine-learning model for predicting the bandwidth quota depletion can include a VAR model that feeds values to a LSTM RNN. The server system 116, during training of this model, can analyze the autocorrelation and correlation between different data traffic aggregated from each of the terminals. For example, the data traffic used to train this mode can include: local bytes sent, local bytes received, and the amount of time in which a bandwidth quota is consumed. Using aggregated data traffic from each of the terminals 102, the server system 116 can score each of the data structures in the data traffic, label the data within the data structures to indicate rates of consumption and idle periods, perform correlation and autocorrelations on the labeled data, and train the model to predict depletion rates for each of the clients associated with the terminals. When the server system 116 trains this machine-learning model, the interdependencies between the cells in the machine-learning model that aid in predicting how the quota will be depleted or how often this particular user will be depleted. For example, if the data traffic indicates that a user has many IDLE periods, then the machine-learning model can determine that the user is likely not going to need a refill and his/her bandwidth quota.

When the server system 116 deploys the trained machine-learning model to each of the terminals 102, each of the terminals 102 can provide input to the trained machine-learning model to produce an indication of bandwidth depletion for a particular client device. For example, the input can include data that includes local network bytes sent for a particular user, local network bytes received for the user, and the actual quota depletion value for the user itself. Each of these values can correspond to a user and any number of devices associated with that user. In this case, the trained machine-learning model can analyzed sequences and vectors of bytes, e.g., from the local network bytes sent, from the local network bytes received, and the actual quota depletion value itself, e.g., 1 TB quota, on a periodic basis. Then, the trained machine-learning model can output a prediction that indicates a number of days remaining before the user is expected to deplete the quota. For example, the trained machine-learning model may output that the user has five days remaining before they will deplete their quota based on past network activity or past user behavior.

In some implementations, each terminal can store a rule-based algorithm for indicating idle periods. The rule-based algorithm can indicate on a periodic basis, e.g., 1 second, 10 seconds, 1 minute, and the like, whether the terminal is idle or not. Each terminal can use this rule-based algorithm to generate additional data to provide to the trained machine-learning model. For example, terminal 102-1 can apply the rule-based algorithm to generate this data in the feature generation module 138 and apply this data along with the feature data to the trained model 135 to produce an indication of idle. Additionally, the terminals can provide the output from the rule-based algorithm to the server system 116 as ground truth testing data. With this ground truth testing data, the server system 116 can iteratively train the machine learning models and compare the results to the output provided by the rule-based algorithm.

FIG. 2A is a block diagram 200 that illustrates an example of a terminal determining an idle time using a machine-learning model. In the block diagram 200, the terminal 102-1 seeks to predict an idle time or one or more future idle times using the machine-learning model. As illustrated, the terminal 102-1 can acquire data traffic 202 that include various data structures, corresponding identifies, and data that includes at least one or more of local bytes sent, local bytes received, satellite network bytes received, satellite network bytes transmitted, and terminal available memory.

A terminal, such as terminal 102-1, can acquire data traffic 202 over various periods of time. For example, the terminal 102-1 can acquire the data traffic 202 on a periodic basis over a period of time, such as over every hour. The terminal 102-1 can acquire data traffic at periodic other intervals as well.

In some implementations, the terminal 102-1 can provide the data traffic 202 to the VAR model 206. The terminal 102-1 can provide the data traffic 202 in a parallel or serial manner. In some cases, the terminal 102-1 can provide the data traffic 202 to a feature generation module, which subsequently provide its output to the VAR model 206. The VAR model 206 can output predicted future values 208 of traffic characteristics. As illustrated in the block diagram 200, the VAR model 206 outputs predicted future values 208 of traffic characteristics, such as, for $d_0$: [0 mb, 2 mb, 3 mb, 1 mb, 1 mb, 0 mb]; $d_1$: [1 mb, 2 mb, 1 mb, 10 mb, 20 mb, 30 mb]; and, $d_2$: [2 mb, 0 mb, 0 mb, 0 mb, 5 mb, 0 mb]. Each of the predicted values can correspond to a time period from the input. For example, in $d_0$, the VAR model 206 produces future values 208 from a current time including 0 mb in the next hour, 2 mb in two hours, 3 mb in three hours, 1 mb in four hours, and so on. The predicted values can also correspond to other time periods.

In some implementations, the terminal 102-1 can provide the future values 208 of traffic characteristics to the LSTM RNN model 210. Additionally, the terminal 102-1 can provide the data traffic 202 to the LSTM RNN model 210. The LSTM RNN model 210 can be trained to use both the future values 208 output from the VAR model 206 and the data traffic 202 also provided to the VAR model 206. In some cases, only some of the data from the data traffic 202 may be provided to the LSTM RNN model 210 for predicting future idle times. In other cases, the entirety of the data traffic 202 may be provided to both the VAR model 206 and the LSTM RNN model 210.

As illustrated in block diagram 200, the LSTM RNN model 210 can provide an output 212 that illustrates future predictions of idle times. The output 212 can include, for example, how likely a time is predicted to be idle for each of the multiple future idle periods. For example, as illustrated in output 212, the vector do indicates that the predicted values include [0 mb, 2 mb, 3 mb, 1 mb, 1 mb, 0 mb] and their corresponding respective scores or percentages include [90%, 80%, 70%, 65%, 55%, 50%]. Similarly, the vector $d_1$ indicates that the predicted values include [1 mb, 2 mb, 1 mb, 10 mb, 20 mb, 30 mb] and their corresponding respective scores or percentages include [100%, 97%, 65%, 20%, 15%, 70%]. Similarly, the vector $d_2$ indicates that the predicted values include [2 mb, 0 mb, 0 mb, 0 mb, 5 mb, 0 mb] and their corresponding respective scores or percentages include [15%, 20%, 90%, 65%, 51%, 90%]. The respective scores or percentages indicate how confident the LSTM RNN model 210 is and a likelihood that the corresponding amount of network traffic will be exhibited at future idle times.

Figure 2B:
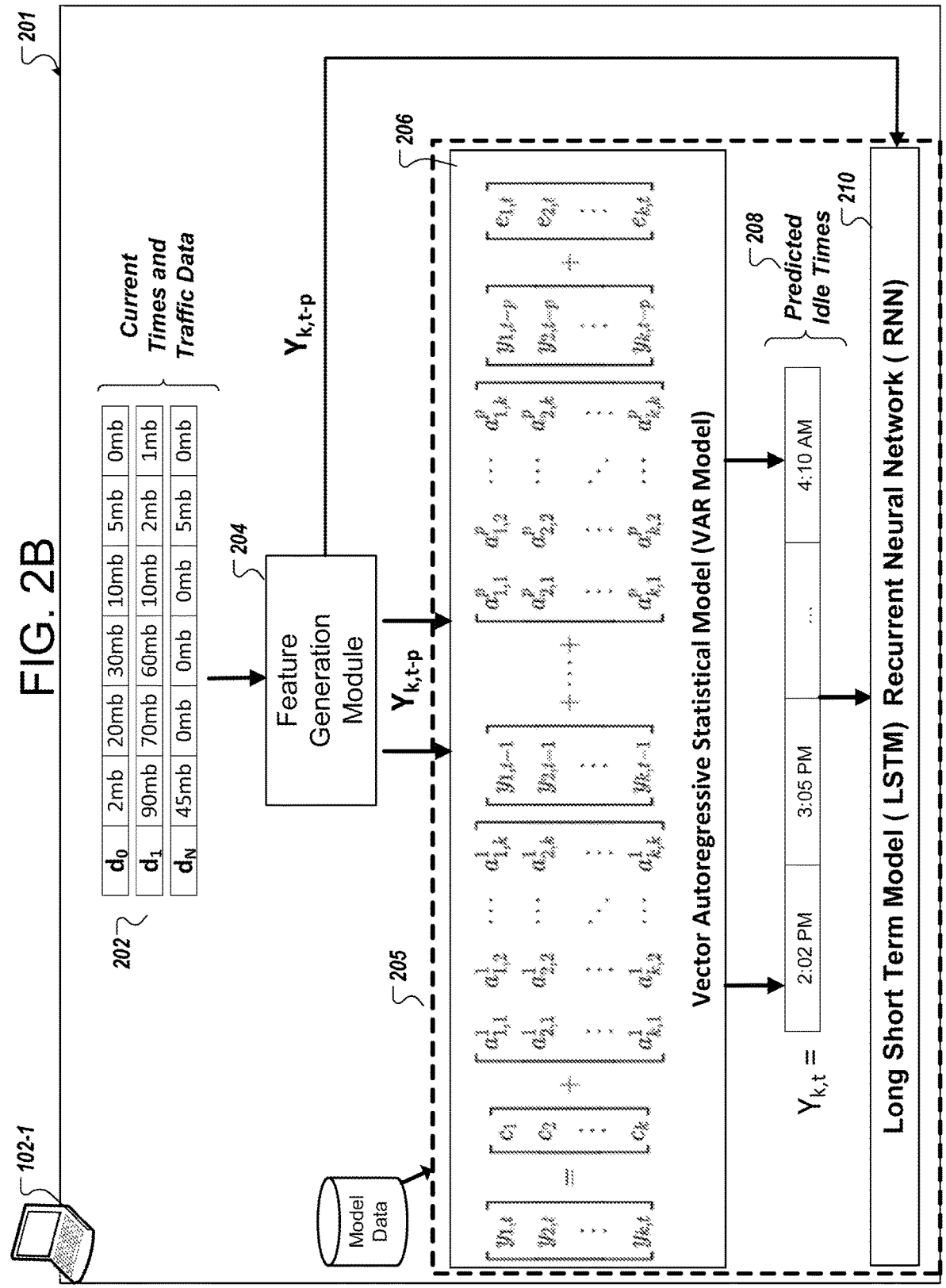

FIG. 2B is a block diagram 201 that illustrates an example of a terminal 102-1 determining an idle time using a machine-learning model. The block diagram 201 includes similar components to block diagram 200. In the block diagram 201, the terminal 102-1 can acquire the data traffic 202 that includes various data structures and corresponding identifiers. The data structures include network traffic of local bytes sent, local bytes received, satellite network bytes received, satellite network bytes transmitted, and terminal available memory, among other things.

The terminal 102-1 can provide the data traffic 202 to the feature generation module 204. Feature generation module 204 performs similar functions as the feature generation module 138. The feature generation module 204 can provide the generated features as output to the trained machine learning module 205. As previously mentioned, the trained machine learning module 205 includes a VAR model 206 and a LSTM RNN model 210. For example, the terminal 102-1 can provide network traffic at each of 2:00 AM, 2:01 AM, 2:02 AM, and 2:03 AM. The VAR model 206 can receive each of the inputs at the different times in matrix format. For example, the VAR model 206 can process the entirety of network data at 2:00 AM, shift the data, then process the entirety of network data at 2:01 AM, shift the data, and repeat for each dataset. In response, the VAR model 206 can output one or more predicted idle times 208. In other examples, the VAR model 206 can output future predicted traffic, such as the predicted future values 208 of traffic characteristics, as illustrated in block diagram 200. In the block diagram 201, the terminal 102-1 can then input the predicted idle times 208 sequentially to the LSTM RNN model 210 for an improvement in the prediction. Additionally, the terminal 102-1 can provide one or more of the generated features to the LSTM RNN model 210 along with the output 208 from the VAR model 206. For example, the LSTM RNN model 210 can output the next predicted idle time at 2:30 AM for a duration of 10 minutes. The LSTM RNN model 210 can also output a score associated with the output next predicted idle time.

FIG. 2C is another block diagram 203 that illustrates an example of a terminal 102-1 determining an idle time using a machine-learning model. Block diagram 203 is a continuation of block diagram 201. The block diagram 203 includes similar components to the block diagram 200. The block diagram 203 further illustrates an example of the LSTM RNN model 210.

As illustrated in the block diagram 201, the predicted idle times 208 output from the VAR model 206 are provided sequentially as input to the LSTM RNN model 210. Additionally, the LSTM RNN model 210 can receive the one or more generated features from the feature generation module 204 along with the predicted idle times 208 to produce an improved prediction idle time 212 along with a confidence score. As the LSTM RNN model 210 retains memory, one predicted idle time and the generated features are provided as input and the LSTM RNN model 210 produces an output predicted idle time 212 with a score. The terminal 102-1 then performs a designated maintenance action at the time indicated by the output predicted idle time 212 if the score output is greater than a threshold.

FIG. 3 is a block diagram 300 that illustrates an example of traffic and network activity at a particular terminal. For example, the block diagram 300 illustrates some of the data types that terminal 102-1 acquired over a period of time. Each terminal can acquire similar data types from each of its connected devices. Each terminal can use these data types to apply to the generated features, and subsequently provide the features as input to the trained machine-learning model to produce future predicted idle times.

As illustrated in FIG. 3, the terminal 102-1 can identify and acquire satellite communications activity over various time periods and label the idle periods as time periods where no activity exists. The terminal 102-1 can also identify and acquire data transfers to and from the terminals with the connected client devices over a period of time. In another example, the terminal 102-1 can track the number of active connections made by the client devices over a period of time. When the client devices seek to transmit or push data, a connection is made to the terminal. In this graph, the number of connections is greater than zero but in some instances, no data is being transmitted to and from the connected client devices.

FIG. 4 is a flow diagram that illustrates an example of a process 400 for performing efficient maintenance in satellite terminals. The process 400 may be performed by the server system 116.

The server system can obtain communication data from a plurality of devices in a communication network, wherein the communication data from each device indicates levels of network traffic for the device over the communication network over time (402). The server system can communicate with a gateway that can communicate with a satellite over a satellite communication network, and the satellite can communicate with various satellite terminals. Each terminal can communicate with one or more client devices. Additionally, each terminal can provide data from their respective client devices to the server system over the satellite and the gateway.

The server system can obtain communication data from each of the terminals to generate time series forecasting data that can be applied to train machine-learning techniques/models to predict idle time associated with a particular terminal. Once sufficiently trained at the server system, the server system can provide the trained models to each of the terminals over the satellite communication network. In this manner, each terminal can individually determine its own idle time based on the client device's traffic and network activity behavior using the trained machine-learning model. As the terminal obtains network and traffic data, the terminal can generate the time series forecasting data and provide the generated time series forecasting data to the trained model, such as on a periodic basis, to produce a predicted idle time. Thus, during a predicted idle time, the corresponding terminal can perform maintenance and rebooting with minimal disruption to the client devices.

The server system can receive communication data representing the network and traffic usage from each terminal. The communication data can include, for example, terminal monitoring load seconds, local network bytes received, local network bytes transmitted, satellite network bytes received, satellite network bytes transmitted, outbound unavailability percentage on a periodic basis, e.g., hourly daily, packet transmission errors, terminal no-connect duration, terminal healthy status time, and terminal available system memory. Each terminal can monitor the communication data over a period of time.

For each of the devices, the server system can generate series of scores for the device based on the communication data for the device, wherein the scores in the series correspond to different time periods in a series of time periods and include values that describe network traffic occurring over the corresponding time period. For the communication data from each device, the server system can generate the series of scores based on the corresponding communication data. For example, the series of scores for each terminal can include one or more data structures or scores that correspond to different time periods in a series of time periods and include values that describe network traffic over a corresponding time period. The length of each score can be N units long. In particular, the series of scores for each terminal can be generated by segmenting the obtained communication data into one or more defined periods, e.g., monthly, daily, or other sizes.

In some implementations, the server system can generate labeled data for each score in the series of scores, the generated labeled data indicating one or more idle periods in each score. For example, the server system can generate and mark periods in the series of scores as idle. The labels can include indications of idle periods within a score as well as indications of non-idle periods with the score. The idle periods can be defined, for example, by a starting and ending index within a score or one or more scores. Additionally, the server system can generate metrics that indicate patterns within each of the scores, e.g., network patterns that lead to patterns of idle times, network patterns that follow patterns of idle times, network patterns indicative of patterns of idle times, and network patterns of non-idle times.

The server system can generate an idle period forecasting model configured to predict occurrence of future communication idle periods in which communication activity is predicted to be below a threshold (404). Moreover, the idle period forecasting model can be configured to predict idle periods based on input data describing network traffic for the device over a series of prior time periods, wherein the idle period forecasting model is generated based on correlating the characteristics of network traffic indicated by the respective series of scores with later-occurring periods identified as idle periods. In some implementations, the server system can generate the idle period forecasting model based on time series forecasting data, which is generated as a result from comparing the labeled data associated with the series of scores from each terminal.

For example, the server system can correlate each of the scores in the series of scores to identify similar periods of idle time and non-idle time. The correlated series of scores at the similar periods of idle and non-idle time can be referenced by indices in the series of scores. Then, the server system can perform an auto-correlation of each score in the series of scores with a past lagged version of the same score to identify dependencies between one or more variables in the communication data, e.g., a score that indicates one or more IDLE periods with a past lagged version of itself. For example, in order for the machine-learning model to more accurately predict the idle time, the machine-learning model is required to understand the relationship between various input parameters that can affect the determined idle time for a particular terminal. The auto-correlation can help determine the interdependencies and co-movements among the input variables of each data structure. In one example, the auto-correlation may help determine a time-delayed relationship between local network bytes received and satellite network bytes received, such that an idle period can be determined when these two variables follow a decreasing byte usage pattern. Other example patterns are also possible.

In some implementations, the server system can use the correlated and auto-correlated results of the time series forecasting data to determine various patterns. One pattern can correspond to data patterns across the one or more correlated and auto-correlated scores that illustrate traffic data leading up to an idle period at each terminal. Another pattern can correspond to data patterns the one or more correlated and auto-correlated scores that illustrate traffic data of idle periods at each terminal. For example, the correlations and auto-correlations can indicate a positive correlation, in which an increase of the variable in one time series can lead to a proportionate increase in a subsequent or another time series, which may correspond to leading up to a non-idle period. Alternatively, for example, the correlations and auto-correlations can indicate a negative correlation, in which a decrease of the variable in one time series can lead to a proportionate decrease in a subsequent or another time series, which may correspond to leading up to an idle period. Other examples are also possible for identifying patterns leading up to idle periods and identifying patterns that indicate idle periods.

In some implementations, based on these identified patterns in the generated time series forecasting data, the server system can determine training data by comparing these patterns to samples from a probability distribution function using hypothesis testing. For example, the server system can apply hypothesis testing to the results of the correlated data to determine whether the data follows a normal distribution or another distribution. If the results of the correlated data follows or can be modeled with a distribution, then the server system can indicate the data will be useful as training data and aid the trained model in predicting future idle times. If the results of the correlated data do not follow or cannot be modeled with a particular distribution, this data may be discarded as the data would not be well fitted to be used as training data for the predictive model. The server system can also apply other statistical methods to the correlated data to be used as training data, such as transformations, normalizing, and other methods to ensure the training data is stationary data, e.g., means, variance, and covariances that do not change over time.

In response to generating the training data, the server system can pre-process the training data to clean and filter unnecessary and superfluous training data. For example, the server system can perform statistical alignment, relevant data extraction, dropping outlier "IDLE" scores, and filtering of statistical data that do not show characteristics of traffic patterns that lead to or follow an idle period. Afterwards, the server system can use the pre-processed data to train a machine-learning model. The machine-learning model can be trained to predict an idle time at a particular terminal using network and data traffic inputs. The trained machine-learning model can include a vector autoregressive statistical (VAR) model and a Long Short-Term Memory Recurrent Neural Network (LSTM RNN). The trained machine-learning model can be configured to predict future occurrences of communication idle periods in which communication activity is predicted be below a threshold based on input data describing network traffic for the terminals over a series of prior time periods.

In some implementations, with the trained machine-learning model or the idle forecasting model, the VAR model and the LSTM RNN model perform different functions. The VAR model can predict if one or more of the input parameters in the time series forecasting data depend on one another. The LSTM model can analyze a segment of the time series data from the VAR model to predict activity at a future time period, such as an hour or minute in the future. This internal state can then be used to extract information, e.g., a prediction as indicated by output at an output layer of the LSTM RNN model, such as a prediction of an idle time for a terminal.

Once trained, the server system can use testing data to determine the accuracy and efficiency of the trained machine learning model. If the server system determines the trained idle period forecasting model is not able to accurately predict the idle period from the test data, then the server system can adjust the characteristics of the trained machine-learning model and can retrain the machine-learning model using statistical and other historical data until the output of the trained machine-learning model matches an idle period found in real statistical data. This process of training and re-training can be performed iteratively over time.

The server system can provide the idle period forecasting model to each of the plurality of devices such that the devices can respectively use the idle period forecasting model to locally predict future communication idle periods of the devices (406). In some implementations, in response to generating a sufficiently trained machine-learning model, the server system can transmit the trained idle period forecasting model to each of the terminals over the satellite communication network. In some cases, the server system may strip down or optimize the trained idle period forecasting model to reduce its complexity and overall storage requirements so the terminals are able to store in its memory the newly received trained model.

In some implementations, when a terminal receives the newly trained model from the server system, the terminal can wait until a predicted idle time to replace its previous trained model with the newly trained model. In particular, the terminal can predict an idle time using the previous trained machine-learning model. When the terminal recognizes a current time matches to the predicted idle time, the terminal can replace the previous machine-learning model with the received newly trained model for future use in predicting idle times.

During the usage of the newly trained machine-learning model, the terminal can obtain communication data representing network and traffic usage between (i) one or more client devices and the terminal and (ii) the terminal and the server system that communicate over the satellite and the gateway. The terminal can generate scores and series of scores from the obtained communication data that represents the network traffic usage on a periodic interval, e.g., every 15 minutes, 30 minutes, or 1 hour, to name a few examples. In response to generating the scores of data, the terminal can provide the series of scores to the newly trained machine-learning model. In response, the newly trained machine learning model can output a predicted idle time, that indicates a future time at which the terminal can undergo maintenance and reboot. Thus, when a current time matches to the predicted idle time, the terminal can perform the maintenance and avoid communication disruption at the terminal and the one or more client devices connected to the terminal. In some cases, the predicted idle time may correspond to a current time or other times in the future to perform maintenance at the terminal.

In some implementations, the terminal may cease performing the maintenance if during a time indicated by a predicted idle time network activity is still above a threshold. This may be the case to avoid any disruption to the one or more connected client devices. In particular, the terminal may determine that at a time indicated by a predicted idle time, the network activity between the terminal and one or more of the connected client devices is above a threshold. In response, the terminal can cease the maintenance being performed at the predicted idle time, e.g., the current time. Next, the terminal can generate data to provide to the server system to retrain the latest idle period forecasting model pushed out by the server system because an incorrect prediction was made. The data can include data identifying the terminal, data identifying the idle period forecasting model, the network activity that led to the predicted idle period, the indication to cease the maintenance at the terminal, and time stamp data. The terminal can transmit this data to the server system over the satellite communication network for retraining of the idle period forecasting model.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
    obtaining, by the one or more computers, communication data from a plurality of devices in a satellite communication network, wherein the communication data from each device indicates levels of network traffic for the device over the satellite communication network over time;
    generating, by the one or more computers, an idle period forecasting model using the obtained communication data, wherein the idle period forecasting model is configured to predict occurrence of future communication idle periods in which communication activity is predicted to be below a threshold; and
    providing, by the one or more computers, the idle period forecasting model via multicast over the satellite communication network to the plurality of devices to enable each device of the plurality of devices to generate, using the idle period forecasting model, predictions of future communication idle periods for the device.

2. The method of claim 1, further comprising:
    for each of the devices, generating, by the one or more computers, series of scores for the device based on the communication data for the device, wherein the scores in the series correspond to different time periods in a series of time periods and include values that describe network traffic occurring over the corresponding time period.

3. The method of claim 2, wherein, for each of the devices, generating the series of scores for the devices based on the communication data for the device comprises generating, by the one or more computers, labeled data for each score in the series of scores, the generated labeled data indicating one or more idle periods in each score.

4. The method of claim 3, wherein generating the labeled data for each score in the series of scores further comprises generating, by the one or more computers, labels to indicate the one or more idle periods within each score, wherein the labels include data that describes a starting index and an ending index within each score that represents the one or more idle periods.

5. The method of claim 4, wherein generating the idle period forecasting model configured to predict the occurrence of the future communication idle periods in which the communication activity is predicted to be below the threshold further comprises wherein the idle period forecasting model being configured to predict idle periods based on input data describing network traffic for the device over a series of prior time periods and the idle period forecasting model is generated based on correlating characteristics of network traffic indicated by the respective series of scores with later-occurring periods identified as idle periods.

6. The method of claim 5, wherein generating the idle period forecasting model configured to predict the occurrence of the future communication idle periods in which the communication activity is predicted to be below the threshold further comprises:
    generating, by the one or more computers, time series forecasting data, the time series forecasting data a result from comparing the labeled data from each device of the plurality of devices, wherein generating the time series forecasting data further comprises:
        correlating, by the one or more computers, each of the scores in the series of scores from each device;
        auto-correlating, by the one or more computers, each score in the series of scores with a past lagged version of the same score to identify dependencies between one or more variables in the communication data;
        determining, by the one or more computers, (i) first patterns across the one or more correlated and auto-correlated scores that illustrate traffic data leading up to an idle period at each device and (ii) second patterns across the one or more correlated and auto-correlated scores that illustrate traffic data of idle periods at each device; and
        determining, by the one or more computers, training data by comparing the first patterns and the second patterns to samples from a probability distribution function using hypothesis testing.

7. The method of claim 1, wherein the idle period forecasting model comprises a vector autoregressive (VAR) statistical model and a Long Short-Term Memory Recurrent Neural Network (LSTM RNN), and
    wherein the providing the idle period forecasting model to each of the plurality of devices comprises broadcasting the idle period forecasting model over the satellite communication network to each of the plurality of devices, wherein individual devices that receive the idle period forecasting model are enabled to separately generate idle forecasts using the idle period forecasting model based on respective historical communication activity of the devices.

8. The method of claim 1, wherein broadcasting the idle period forecasting model updates the devices in the plurality of devices by replacing an existing idle period forecasting model previously stored by the devices.

9. The method of claim 1, wherein the idle period forecasting model provided to the plurality of devices configures the devices to each separately generate predictions using the idle period forecasting model, wherein the devices are configured to respectively generate different predictions of communication idle periods based on their respective measures of communication activity.

10. The method of claim 1, wherein the devices in the plurality of devices are satellite terminals; and
wherein the idle period forecasting model is configured to (i) receive input indicating communication activity over the satellite communication network including traffic from one or more client devices connected to the satellite terminal and (ii) provide output that predicts future communication idle periods in which communication activity over the satellite communication network, including traffic from the one or more client devices connected to the satellite terminal, is predicted to be below the threshold.

11. The method of claim 1, wherein the devices are configured to delay automatically performing maintenance that involves at least one of rebooting, restarting or applying a software update until a communication idle period is predicted to occur, and the idle period forecasting model enables the devices to each use the same idle period forecasting model to generate different predictions of future communication idle periods based on respective patterns of communication over the satellite communication network of the devices.

12. The method of claim 1, wherein the idle period forecasting model is configured to predict occurrence of future communication idle periods in which communication activity is predicted remain below the threshold for at least a predetermined minimum amount of time.

13. A system comprising:
one or more computers and one or more storage devices storing instructions that are operable, when executed by the one or more computers, to cause the one or more computers to perform operations comprising:
obtaining, by the one or more computers, communication data from a plurality of devices in a satellite communication network, wherein the communication data from each device indicates levels of network traffic for the device over the satellite communication network over time;
generating, by the one or more computers, an idle period forecasting model using the obtained communication data, the idle period forecasting model configured to predict occurrence of future communication idle periods in which communication activity is predicted to be below a threshold; and
providing, by the one or more computers, the idle period forecasting model via multicast over the satellite communication network to the plurality of devices to enable each device of the plurality of devices to generate, using the idle period forecasting model, predictions of future communication idle periods of the device.

14. The system of claim 13, further comprising:
for each of the devices, generating, by the one or more computers, series of scores for the device based on the communication data for the device, wherein the scores in the series correspond to different time periods in a series of time periods and include values that describe network traffic occurring over the corresponding time period.

15. The system of claim 14, wherein, for each of the devices, generating the series of scores for the devices based on the communication data for the device comprises generating, by the one or more computers, labeled data for each score in the series of scores, the generated labeled data indicating one or more idle periods in each score.

16. The system of claim 15, wherein generating the labeled data for each score in the series of scores further comprises generating, by the one or more computers, labels to indicate the one or more idle periods within each score, wherein the labels include data that describes a starting index and an ending index within each score that represents the one or more idle periods.

17. The system of claim 16, wherein generating the idle period forecasting model configured to predict the occurrence of the future communication idle periods in which the communication activity is predicted to be below the threshold further comprises wherein the idle period forecasting model being configured to predict idle periods based on input data describing network traffic for the device over a series of prior time periods and the idle period forecasting model is generated based on correlating characteristics of network traffic indicated by the respective series of scores with later-occurring periods identified as idle periods.

18. The system of claim 17, wherein generating the idle period forecasting model configured to predict the occurrence of the future communication idle periods in which the communication activity is predicted to be below the threshold further comprises:
generating, by the one or more computers, time series forecasting data, the time series forecasting data a result from comparing the labeled data from each device of the plurality of devices, wherein generating the time series forecasting data further comprises:
correlating, by the one or more computers, each of the scores in the series of scores from each device;
auto-correlating, by the one or more computers, each score in the series of scores with a past lagged version of the same score to identify dependencies between one or more variables in the communication data;
determining, by the one or more computers, (i) first patterns across the one or more correlated and auto-correlated scores that illustrate traffic data leading up to an idle period at each device and (ii) second patterns across the one or more correlated and auto-correlated scores that illustrate traffic data of idle periods at each device; and
determining, by the one or more computers, training data by comparing the first patterns and the second patterns to samples from a probability distribution function using hypothesis testing.

19. The system of claim 13, wherein the idle period forecasting model comprises a vector autoregressive (VAR) statistical model and a Long Short-Term Memory Recurrent Neural Network (LSTM RNN), and
wherein the providing the idle period forecasting model to each of the plurality of devices comprises broadcasting the idle period forecasting model over a satellite communication network to each of the plurality of devices, wherein individual devices that receive the idle period forecasting model are enabled to separately generate idle forecasts using the idle period forecasting model based on respective historical communication activity of the devices.

20. One or more non-transitory computer-readable media storing software comprising instructions executable by one or more computers which, upon such execution, cause the one or more computers to perform operations comprising:

obtaining, by the one or more computers, communication data from a plurality of devices in a satellite communication network, wherein the communication data from each device indicates levels of network traffic for the device over the satellite communication network over time;

generating, by the one or more computers, an idle period forecasting model using the obtained communication data, the idle period forecasting model configured to predict occurrence of future communication idle periods in which communication activity is predicted to be below a threshold; and providing, by the one or more computers, the idle period forecasting model via multicast over the satellite communication network to the plurality of devices to enable each device of the plurality of devices to generate, using the idle period forecasting model, predictions of future communication idle periods of the device.

\* \* \* \* \*